United States Patent
Burk

(10) Patent No.: US 9,416,998 B2
(45) Date of Patent: Aug. 16, 2016

(54) HEAT PUMP ACCORDING TO THE ADSORPTION PRINCIPLE

(75) Inventor: Roland Burk, Stuttgart (DE)

(73) Assignee: MAHLE International GmbH, Stuttgart (DE)

(*) Notice: Subject to any disclaimer, the term of this patent is extended or adjusted under 35 U.S.C. 154(b) by 830 days.

(21) Appl. No.: 13/508,208

(22) PCT Filed: Nov. 8, 2010

(86) PCT No.: PCT/EP2010/066982
§ 371 (c)(1),
(2), (4) Date: Jul. 20, 2012

(87) PCT Pub. No.: WO2011/054950
PCT Pub. Date: May 12, 2011

(65) Prior Publication Data
US 2012/0279250 A1    Nov. 8, 2012

(30) Foreign Application Priority Data
Nov. 6, 2009   (DE) .......................... 10 2009 052 252

(51) Int. Cl.
*F25B 17/00*      (2006.01)
*F25B 30/04*      (2006.01)
(Continued)

(52) U.S. Cl.
CPC .............. *F25B 30/04* (2013.01); *F25B 17/083* (2013.01); *F25B 13/00* (2013.01); *F25B 17/00* (2013.01); *F25B 30/00* (2013.01); *F25B 30/02* (2013.01); *F25B 30/06* (2013.01); *F25B 2600/2507* (2013.01)

(58) Field of Classification Search
CPC .......... F25B 17/00; F25B 30/00; F25B 30/02; F25B 30/04; F25B 30/06; F25B 13/00; F25B 17/083

USPC ................................................ 62/477, 324.6
See application file for complete search history.

(56) References Cited

U.S. PATENT DOCUMENTS 2,087,939 A    7/1937  Saernmark
4,372,376 A *  2/1983  Nelson et al. ............ 165/104.12
(Continued)

FOREIGN PATENT DOCUMENTS

CH    691 744 A5    9/2001
DE    33 04 014 A1  8/1984
(Continued)

OTHER PUBLICATIONS

Machine translation of DE 19818807.*
(Continued)

*Primary Examiner* — Marc Norman
*Assistant Examiner* — David Teitelbaum
(74) *Attorney, Agent, or Firm* — Paul D. Strain, Esq.; Strain & Strain PLLC

(57) ABSTRACT

The invention relates to a heat pump according to the adsorption principle, comprising a plurality of hollow elements each having an adsorbent, wherein a working medium is enclosed in each of the hollow elements is displaceable between the adsorbent and a phase change area, wherein a heat-transporting fluid in a variable fluid circuit can flow through the hollow elements by means of a valve arrangement. The hollow elements are brought into thermal contact with the fluid in the area of the adsorbent, wherein the flow through the hollow elements changes cyclically with the fluid, wherein at least two of the hollow elements are flown through parallel from the fluid at least in one, in particular each position of the valve arrangement, and at least two of the hollow elements are flown through serially one after the other.

19 Claims, 16 Drawing Sheets

Figure 2:
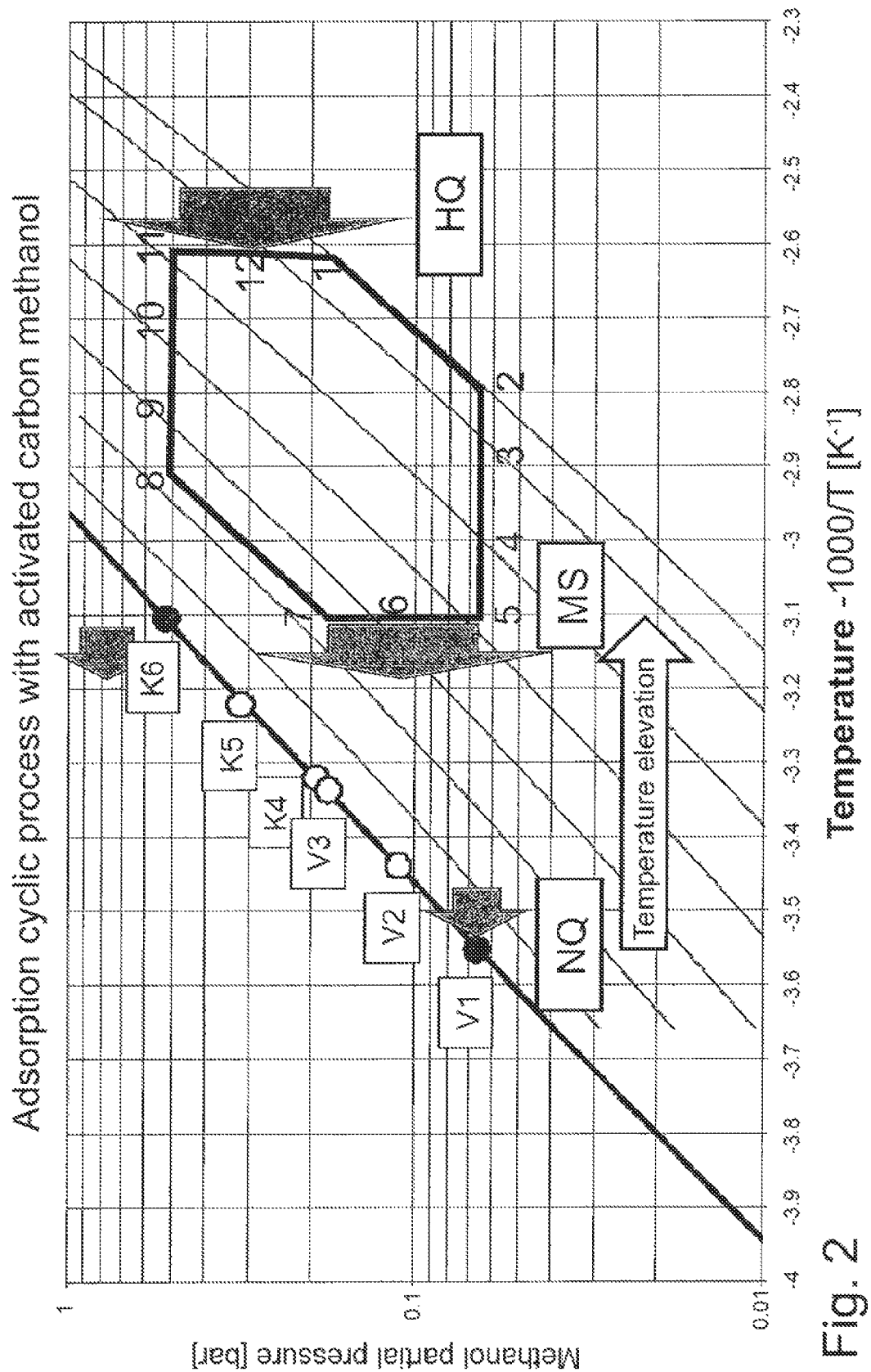

(51) Int. Cl.
*F25B 17/08* (2006.01)
*F25B 30/00* (2006.01)
*F25B 30/02* (2006.01)
*F25B 30/06* (2006.01)
*F25B 13/00* (2006.01)

(56) References Cited

U.S. PATENT DOCUMENTS

| | | |
|---|---|---|
| 5,802,870 A | 9/1998 | Arnold et al. |
| 2011/0030408 A1 | 2/2011 | Burk et al. |

FOREIGN PATENT DOCUMENTS

| | | |
|---|---|---|
| DE | 35 09 564 A1 | 9/1986 |
| DE | 197 30 699 A1 | 1/1999 |
| DE | 198 18 807 A1 | 10/1999 |
| DE | 10 2008 060 698 A1 | 8/2009 |
| JP | 10-227543 A | 8/1998 |
| JP | 11-118284 A | 4/1999 |
| JP | 11-118286 A | 4/1999 |
| JP | 2000-346484 A | 12/2000 |
| RU | 2 053 463 C1 | 1/1996 |
| SU | 1268114 A3 | 10/1986 |
| WO | WO 2007/068481 A1 | 6/2007 |

OTHER PUBLICATIONS

Machine translation of JP 2000346484.*
Machine translation of DE 102008060698.*
International Search Report, PCT/EP2010/066982, Apr. 25, 2012, 3 pgs.

* cited by examiner

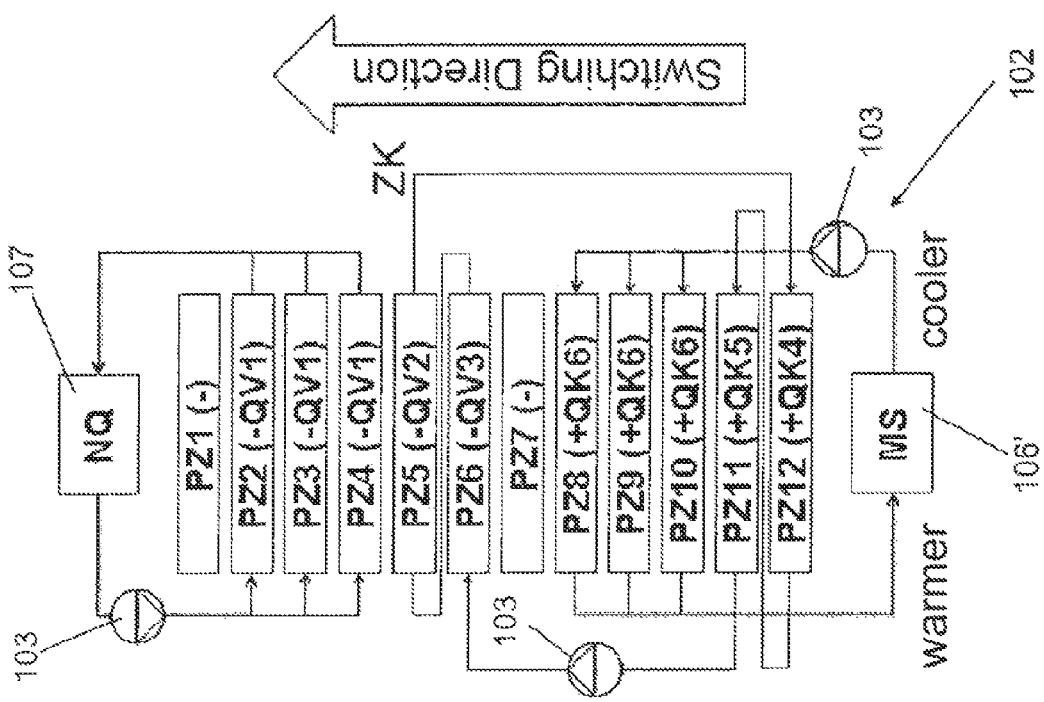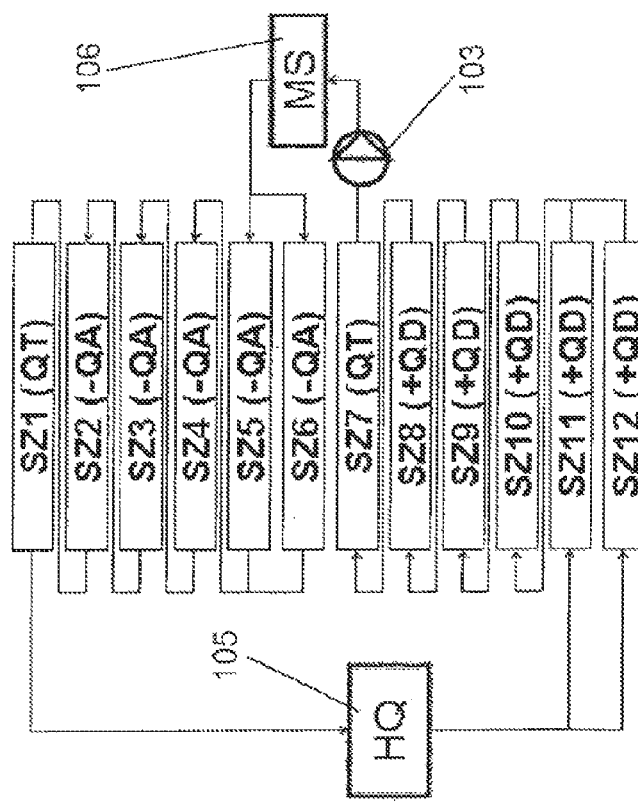
Fig. 1

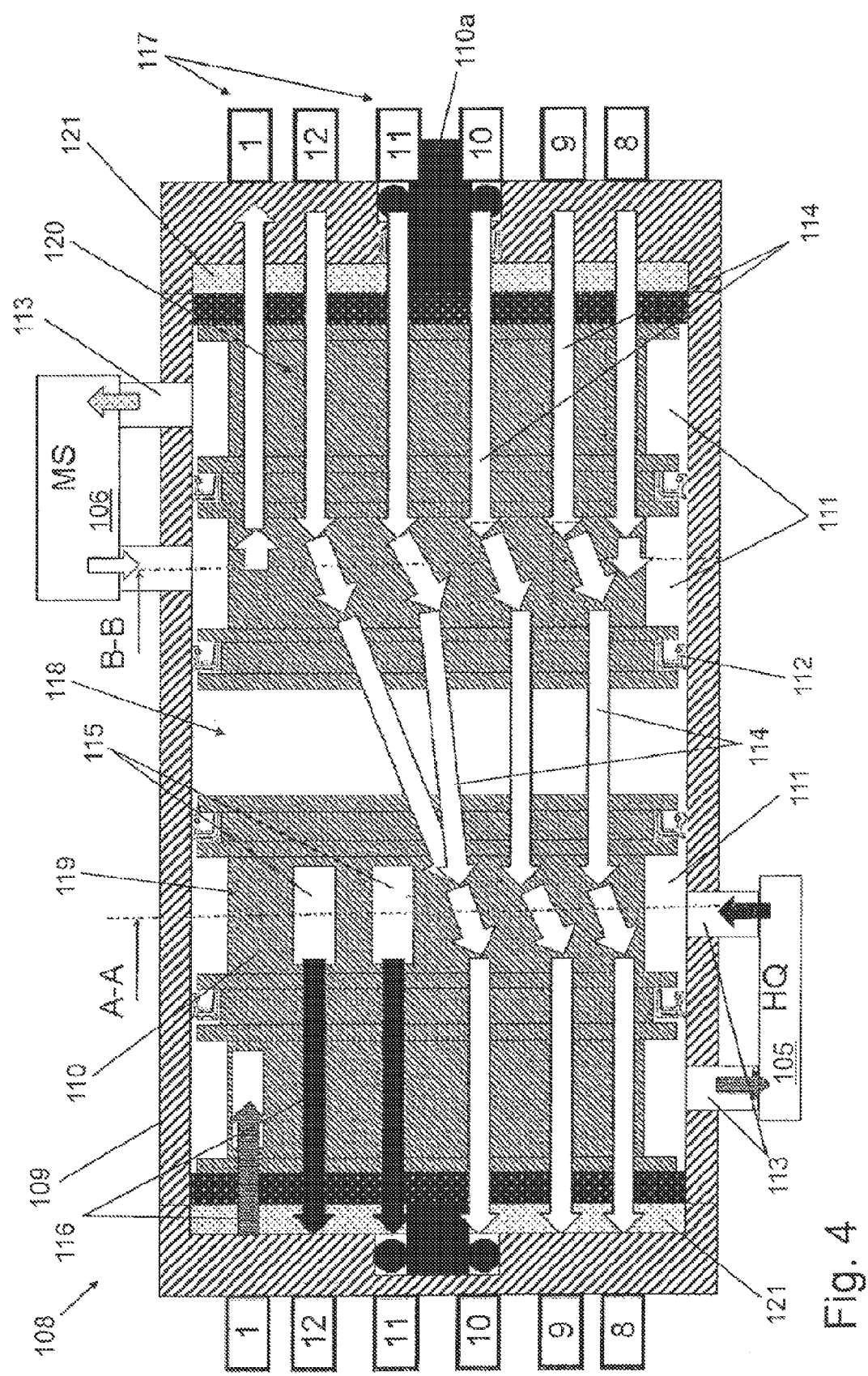

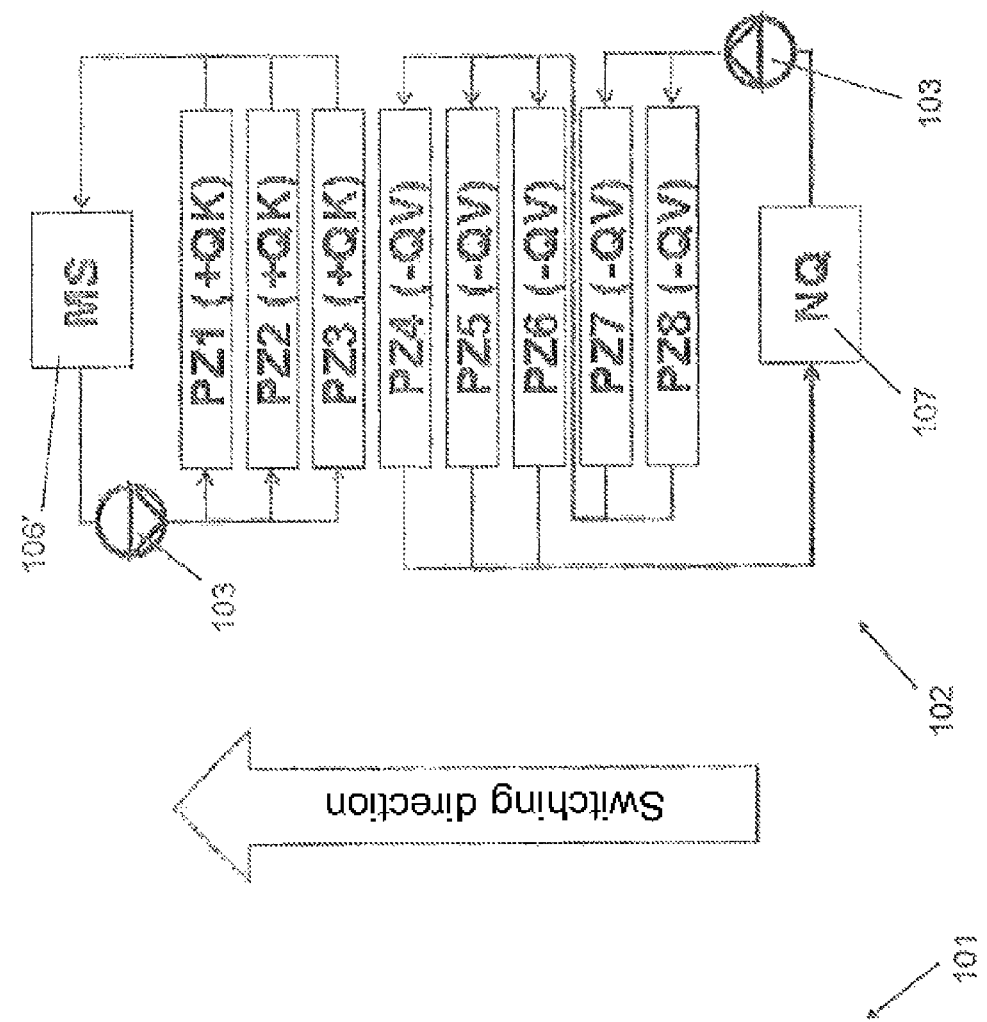
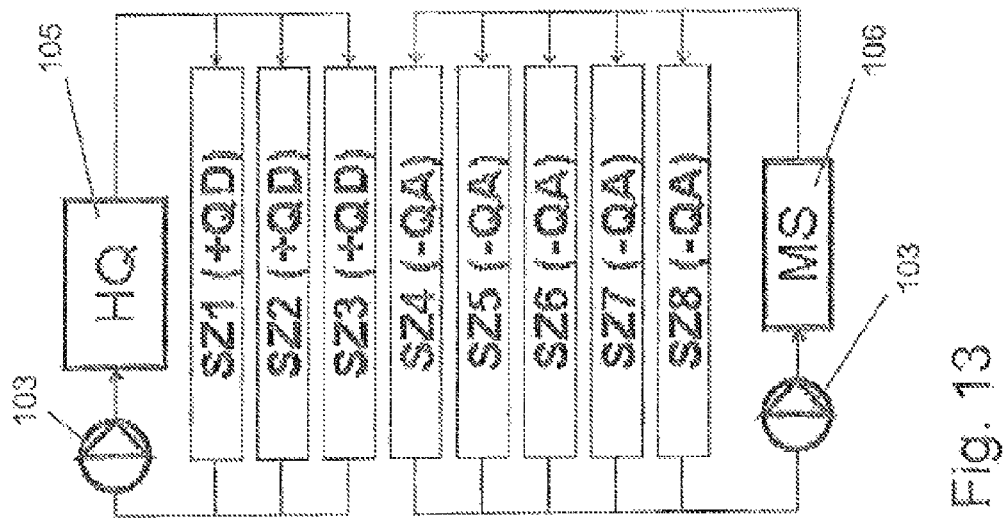
Fig. 13

HEAT PUMP ACCORDING TO THE ADSORPTION PRINCIPLE

CROSS-REFERENCE TO RELATED PATENT APPLICATIONS

This application is a National Stage of International Application No. PCT/EP2010/066982, filed Nov. 8, 2010, which is based upon and claims the benefit of priority from prior German Patent Application No. 10 2009 052 252.2, filed Nov. 6, 2009, the entire contents of all of which are incorporated herein by reference in their entirety.

The invention relates to a heat pump according to the preamble of claim 1.

WO 2007/068481 A1 describes an adsorption heat pump which is composed of a plurality of hollow elements each with an adsorption/desorption area and a vaporization/condensation area or phase change area. A heat-transporting fluid flows through the hollow elements at each of the areas, wherein the connection of the hollow elements with respect to the flow of fluid is changed cyclically by means of valve arrangements.

The object of the invention is to specify a heat pump according to the adsorption principle for which a particularly wide field of application is made possible.

This object is achieved for a heat pump of the type mentioned at the beginning having the inventive features of claim 1. As a result of the parallel flow through some of the hollow elements in the area of the adsorption means (sorption side of the heat pump), the sorption-side temperatures of these hollow elements can be largely equalized, as a result of which the underlying thermodynamic cyclic process is expanded.

This can be used, for example, to increase the temperature elevation of the heat pump. In particular, in this context a relatively small temperature shift may be present. The temperature elevation is understood here to be the temperature interval in the user process and/or between a low temperature heat source (NQ) and a medium temperature heat sink (MS), that is to say, for example in the case of the use as a cooling device a lowest possible vaporizer temperature and/or highest possible recooling temperature (or condensation temperature and adsorption temperature). The temperature elevation is understood here to be the temperature interval in the heat-input process, that is to say for example the temperature interval between a (high temperature) heat source and a recooling or a medium temperature heat sink, that is to say the recooling temperature in the case of a cooling operating mode. In particular, the solution according to the invention permits the ratio between the temperature elevation and the temperature shifts to be increased without a charge range of the process being reduced too much so that an expanded field of application is obtained. In a complementary fashion the invention can also be used to increase the usable charge range for a given temperature elevation and therefore increase the thermal COP (coefficient of performance) of the system.

In one preferred embodiment of the invention there is provision here that in each position of the valve arrangement there is a parallel flow in each case in at least two groups of the plurality of hollow elements, wherein at least one of the groups is arranged directly downstream of a heat exchanger. The heat exchangers expediently exchange with respective heat reservoirs at different temperature levels, for example of a heating source, on the one hand, and of a recooling reservoir, on the other. Examples of a heating source may be, for example, a solar module or dissipated heat of a block heat and power plant. The recooling reservoir may be, for example, the external air, wherein the corresponding heat exchanger permits "dry" discharging of heat into the surroundings.

In order to optimize the ratio between the temperature elevation and the temperature shift it is generally advantageous to provide that the total number of hollow elements through which there is a parallel flow corresponds at least approximately to a quarter, in particular at least approximately a third, of the total number of hollow elements through which there is a flow.

In one particularly preferred embodiment of the invention there is also provision that a further heat-transporting fluid can flow through the hollow elements in a fluid circuit which can be varied, in particular, by means of a further valve arrangement, as a result of which the hollow elements are brought into thermal contact with the further fluid in the phase change area, wherein the flow of the further fluid through the hollow elements changes cyclically. A further increase in the temperature elevation can be achieved by the partially parallel flow not only in the adsorption area but also in the phase change area. Depending on the specific embodiment, the fluid circuit of the phase change side can be separated completely form the adsorber side, wherein for the purpose of further optimization different fluids can also be used. In specific cases, the fluid circuits can, however, also be connected to one another, for example for the purpose of a common and therefore cost-effective use of the same heat exchanger as a recooler. Examples of particularly suitable heat-transporting fluids of a heat pump according to the invention are customary water-glycol mixtures, if appropriate with corrosion protection additives such as are used in cooling circuits.

Expediently, a respective separate valve arrangement for bringing about a cyclically changing flow through the hollow elements is provided both for the fluid circuit of the adsorption side and for the fluid circuit of the phase change side. However, it is generally also conceivable for both sides to be actuated by the same integrated valve arrangement. The invention also generally comprises all the designs of valve arrangements.

In one preferred configuration of a detail, in at least one, in particular each position of the, in particular, further valve arrangement, the further fluid flows in parallel through at least two of the hollow elements in the phase change area, wherein the flow passes through at least two of the hollow elements serially in succession. In a preferred, but not necessary development, there is provision here that in each position of the, in particular, further valve arrangement, the further fluid flows in each case in parallel through at least two groups of the plurality of hollow elements in the phase change area, wherein a heat exchanger is arranged directly upstream of at least one of the groups.

A heat pump in which there is respectively a parallel flow through a number of hollow elements and a serial flow through a number of hollow elements both on the sorption side and on the phase change side is particularly effective in the sense of the invention. In this context, these various hollow elements through which there is a flow should be arranged at a defined phase relationship with respect to the two sides. It is therefore particularly advantageously possible for those hollow elements of one group which have a parallel flow with respect to one another in their sorption areas to have a serial flow with respect to one another on their phase change side, and versa visa. For the purpose of fine optimization of the function of the heat pump, this assignment of hollow elements which have a parallel (serial) flow on the sorption side and a serial (parallel) flow on the phase change side can, however, also have a certain degree of phase shift, for example by one or two hollow elements, with respect to one another. Alternatively or additionally, the times of a valve adjustment can be shifted by a defined time step with respect to one another. This allows the thermal inertia of the system to be taken into account.

In one preferred embodiment of the invention, in a given position of the valve arrangement, a subset of the hollow elements is connected to form a partial circuit, wherein the heat-transporting fluid is circulated via the partial circuit by an additional circulation pump. As a result, generally a degree of freedom is provided in order to set at least partially independently of one another the mass flows of the various groups of hollow elements through which there is a parallel flow and a serial flow. In a first possible configuration of a detail, a total of two circulation pumps are provided, wherein a first partial circuit is circulated by a first circulation pump, and a second partial circuit communicates with the first partial circuit and is circulated by a second circulation pump. As a result, a good compromise is achieved between structural complexity and controllability of the mass flows. In order to determine in an optimum way the mass flows for the various groups of hollow elements through which there is a parallel flow and a serial flow, there may, however, also be provision that a total of three partial circuits are provided, wherein the partial circuits are separated and are each circulated by one of three circulation pumps.

In one alternative, cost-effective design it may also be possible to provide just a single circulation pump, wherein simple apportioning of the mass flows to the hollow elements is done by branches.

In a further optimized embodiment of a heat pump, in each case a heat-transporting fluid does not flow through at least one of the hollow elements, in particular in its phase change area. In a preferred configuration of a detail, in this context the hollow element through which there is not a flow is arranged in each case between a group of hollow elements which absorb heat in the phase change area and a group of hollow elements which output heat in the phase change area. As a result, an adiabatic zone is created between the phase change areas of adjacent hollow elements with a particularly large temperature difference, as a result of which undesired heat flow is reduced and the efficiency of the heat pump is improved overall.

In one advantageous embodiment of the invention, the valve arrangement comprises at least one, in particular precisely one rotation valve with a cylindrical casing and a valve body which is arranged rotatably therein. In this context, a separate valve arrangement is generally assigned both to the sorption side and to the phase change side, but said valve arrangements may respectively be of a similar or identical design.

In one preferred development of a simple and effective design, the rotation valve comprises end-side feed lines and discharge lines for connecting to the individual hollow elements.

A generally advantageous design of rotation valve of a heat pump provides that the valve body forms at least one annular space, wherein at least two axial ducts open into the annular space, which ducts are each connected to hollow elements which are connected in parallel, and wherein at least one radial opening of the annular space is provided, which opening is connected to the at least two axial ducts via the annular space. This permits easy implementation of the parallel connection of groups of the hollow elements via the axial ducts, wherein in addition the hollow elements which are connected in parallel are changed over by turning the valve body further. The radial connections of the annular spaces are expediently connected to heat exchangers which are therefore arranged upstream or downstream of the hollow elements connected in parallel, depending on the direction of flow.

The object of the invention is also achieved for a heat pump as mentioned at the beginning by means of the characterizing features of claim 15. By virtue of the fact that at least a first subset of the hollow elements is arranged downstream of a first circulation pump and a second subset of the hollow elements is arranged upstream of a second circulation pump, it is possible, inter alia, to achieve particularly effective exchange of heat with a given structural size. In one preferred embodiment, in this context the at least one of the subsets comprises at least two hollow elements which are arranged parallel to one another downstream of the respective circulation pump. Usually a relatively large number of hollow elements, for example 8 or 12, are provided, wherein each of the subsets is assigned two or more of the hollow elements in a respective switched position. However, given corresponding requirements at least one of the subsets may also comprise only the minimum number of precisely one hollow element.

In one particularly preferred embodiment of the invention there is provision that in the at least one position of the valve arrangement the two subsets of hollow elements belong to two separate partial circuits of the fluid. As a result, a particularly high power density of the heat pump is made possible. Particularly preferably, the separate partial circuits here have different numbers of hollow elements depending on the type of heat source or heat sink with which the partial circuits exchange. If, for example, the first partial circuit is connected to a high temperature heat source (HQ) and the second partial circuit is connected to a medium temperature heat sink (MS), the number of hollow elements of the first partial circuit is preferably lower than that of the second partial circuit. The distribution of the hollow elements between the two partial circuits preferably has a ratio between 1:3 and 1:1, particularly preferably between approximately 2:5 and approximately 4:5. If the total number of hollow elements permits it, an apportionment of approximately 1:2 is particularly advantageous.

In one alternative or supplementary embodiment of the invention there is provision that the first subset of hollow elements belongs to a first partial circuit of the fluid, and the second subset of hollow elements belongs to a second partial circuit of the fluid, wherein the two partial circuits are connected to one another via at least one hollow element. As a result, on the one hand, effective exchange of heat and therefore a good power density are provided, wherein in addition an increase in the total efficiency is made possible through heat-recovering coupling of the partial circuits. In one particularly preferred configuration of a detail, a connection of in each case precisely one of the hollow elements of the partial circuits to the respective other partial circuit is present. This may occur, for example, through suction-side connection of the outlet of the respective precisely one hollow element to the circulation pump of the other partial circuit.

In order to optimize the heat pump there may also generally advantageously be provision that the valve arrangement contains cross-sectional adaptations and/or restrictor elements for the flow to the individual connected hollow elements, which cross-sectional adaptations and/or restrictor elements cause the recovered heat to be maximized. There is generally advantageously provision that a heat pump as claimed in one of claims 15 to 19 also has the characterizing features of one or more of claims 1 to 14 in order to permit further optimizations.

Further advantages and features of the invention emerge from the exemplary embodiments described below and from the dependent claims.

Figure 3:
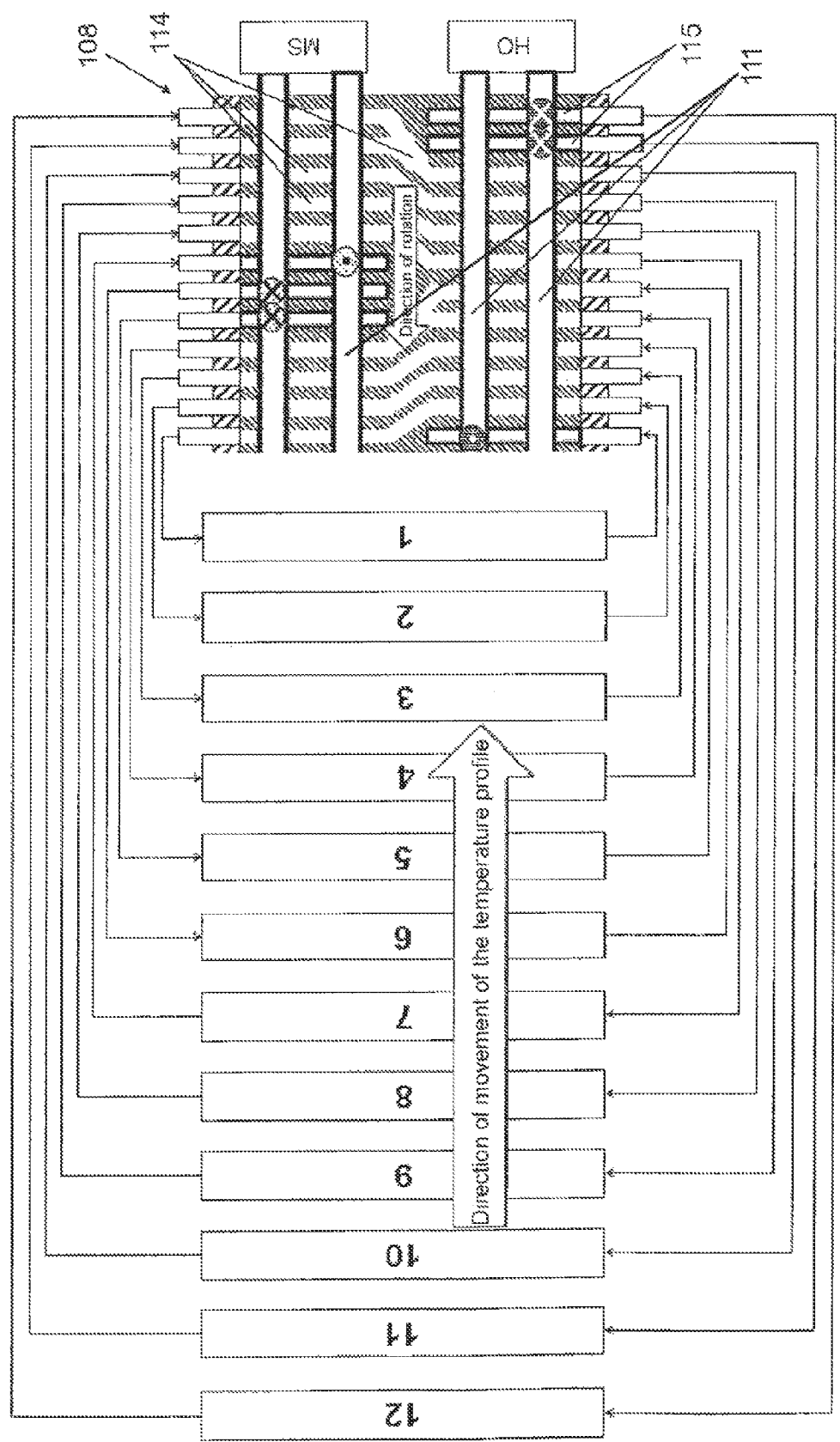
Figure 6:
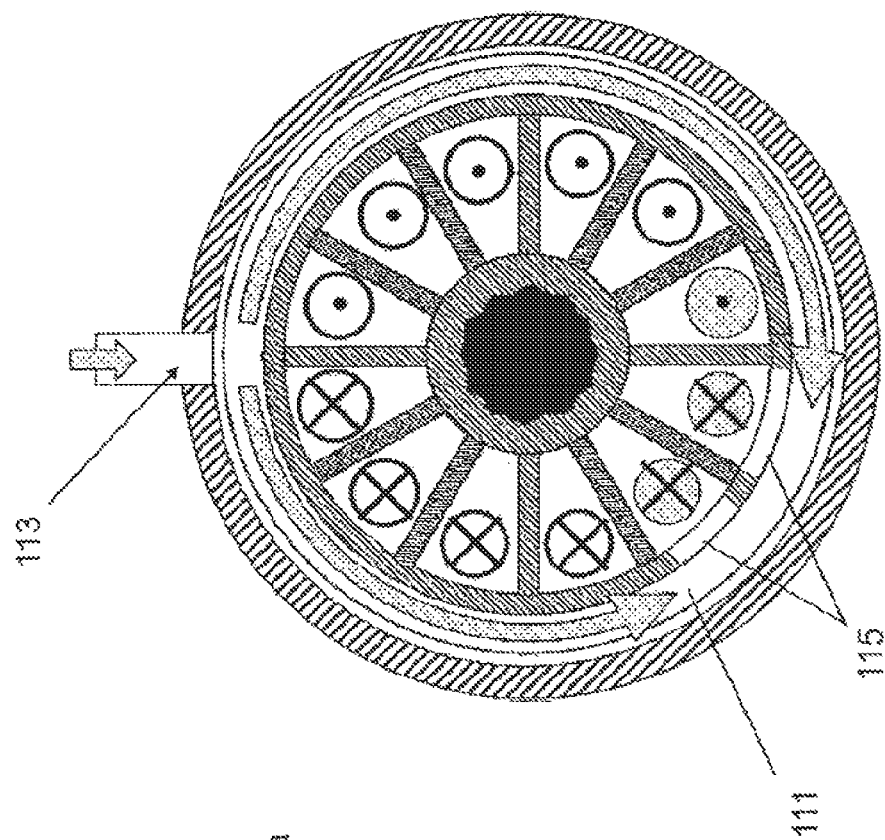
Figure 5:
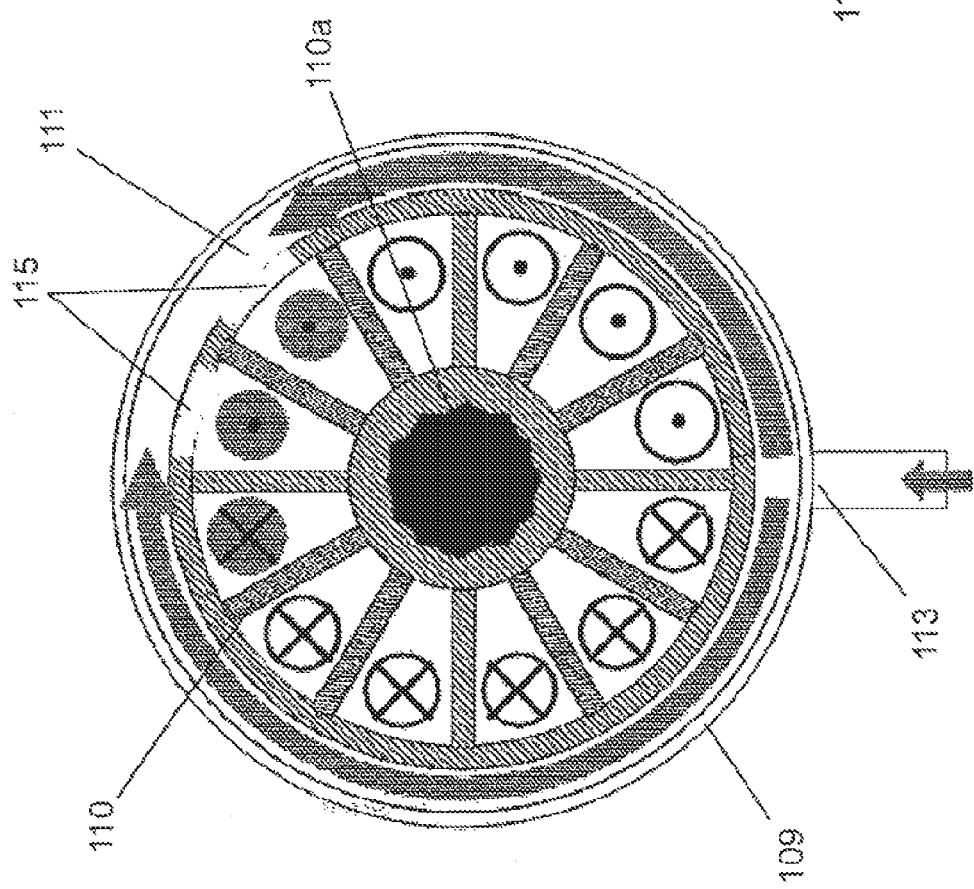
Figure 7:
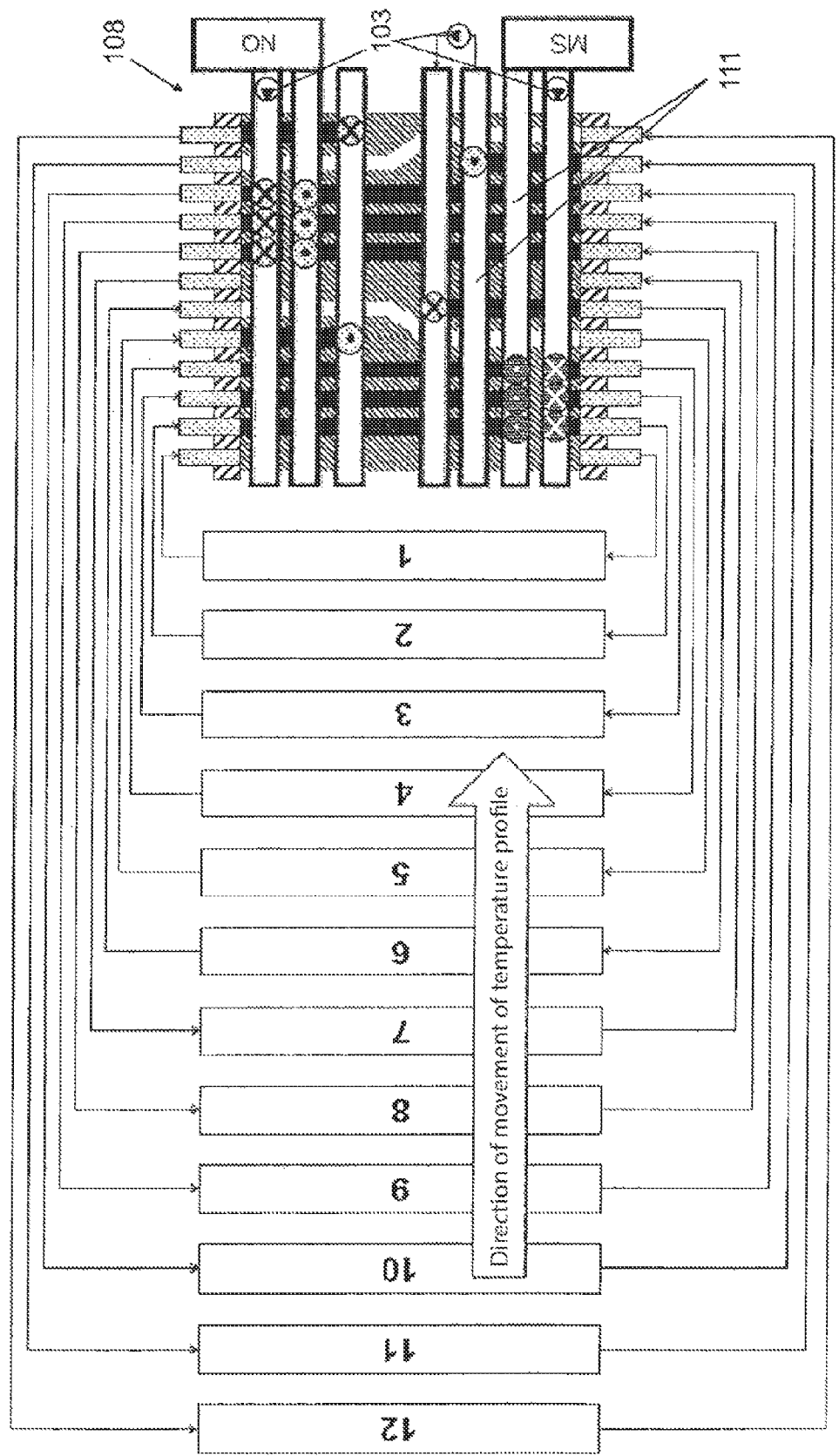
Figure 8:
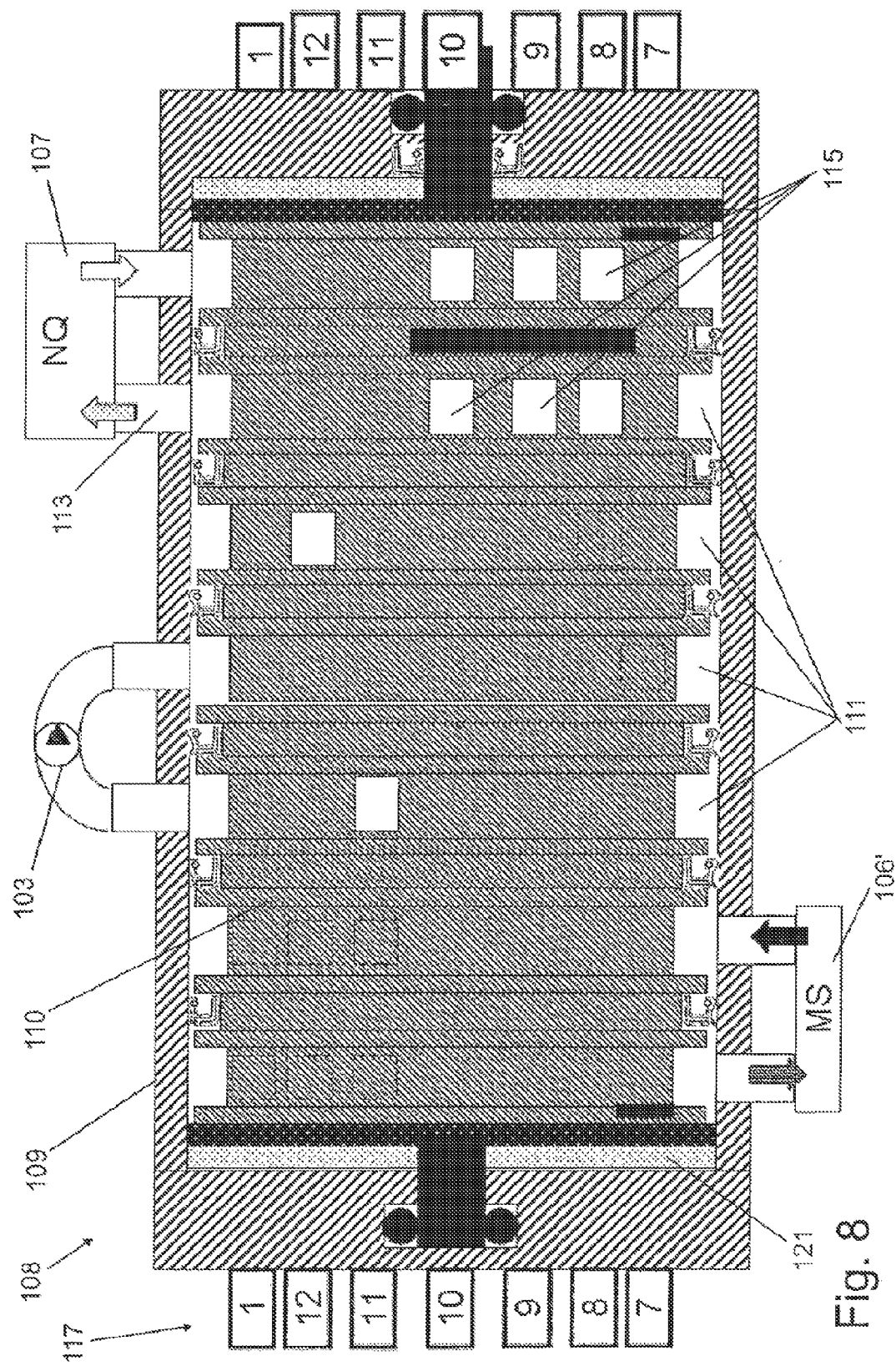
Figure 9:
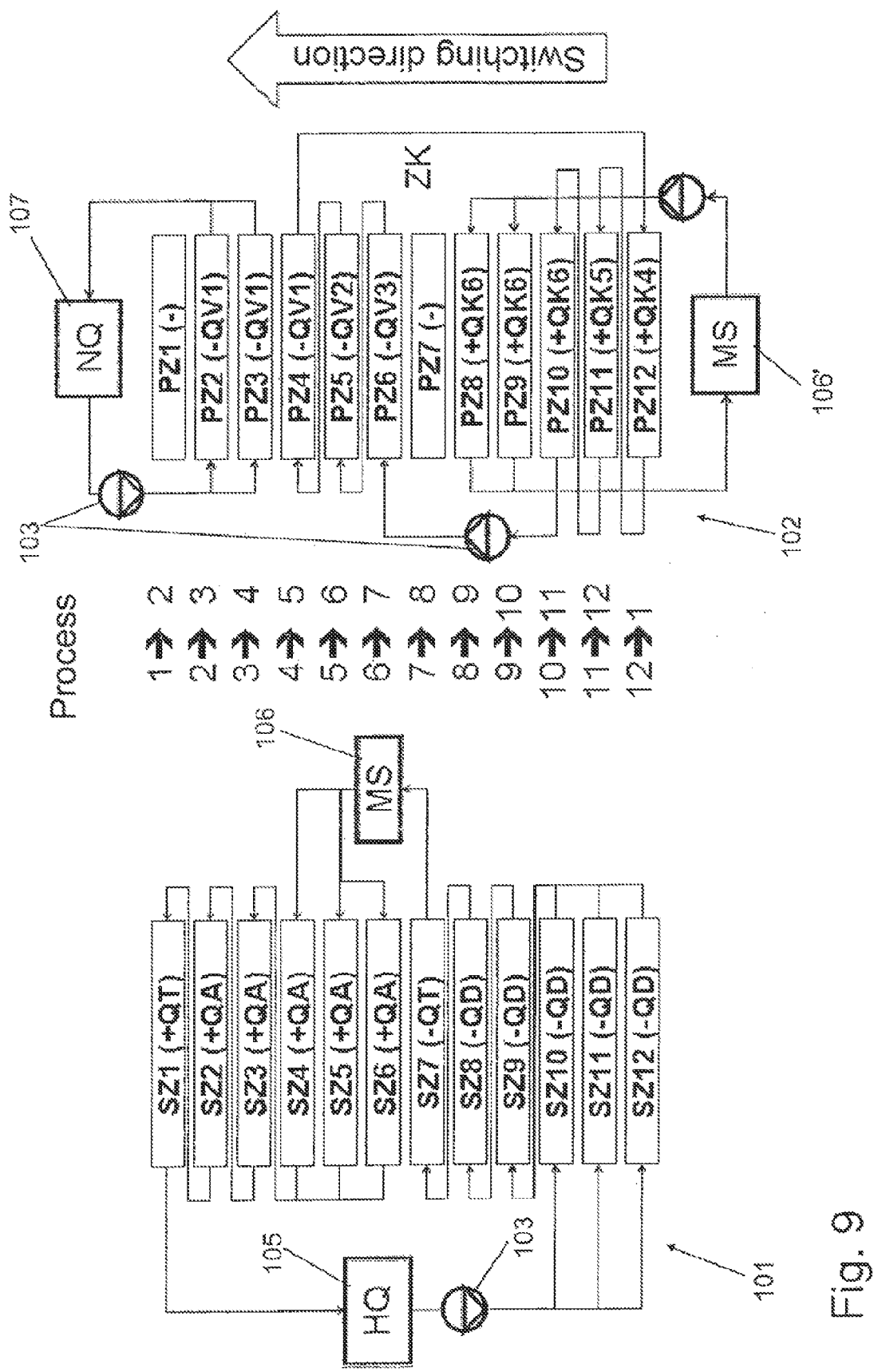
Figure 10:
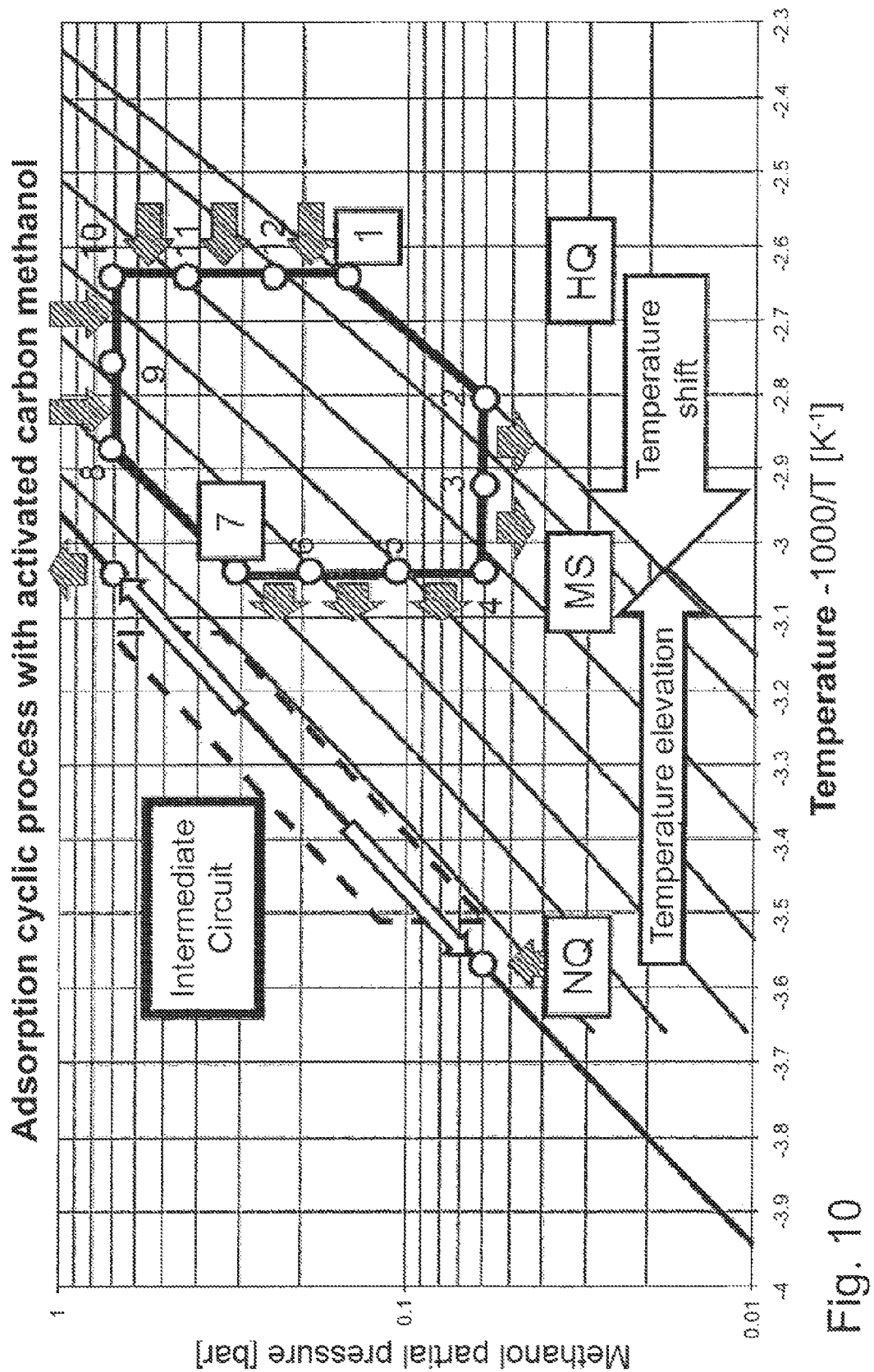
Figure 11:
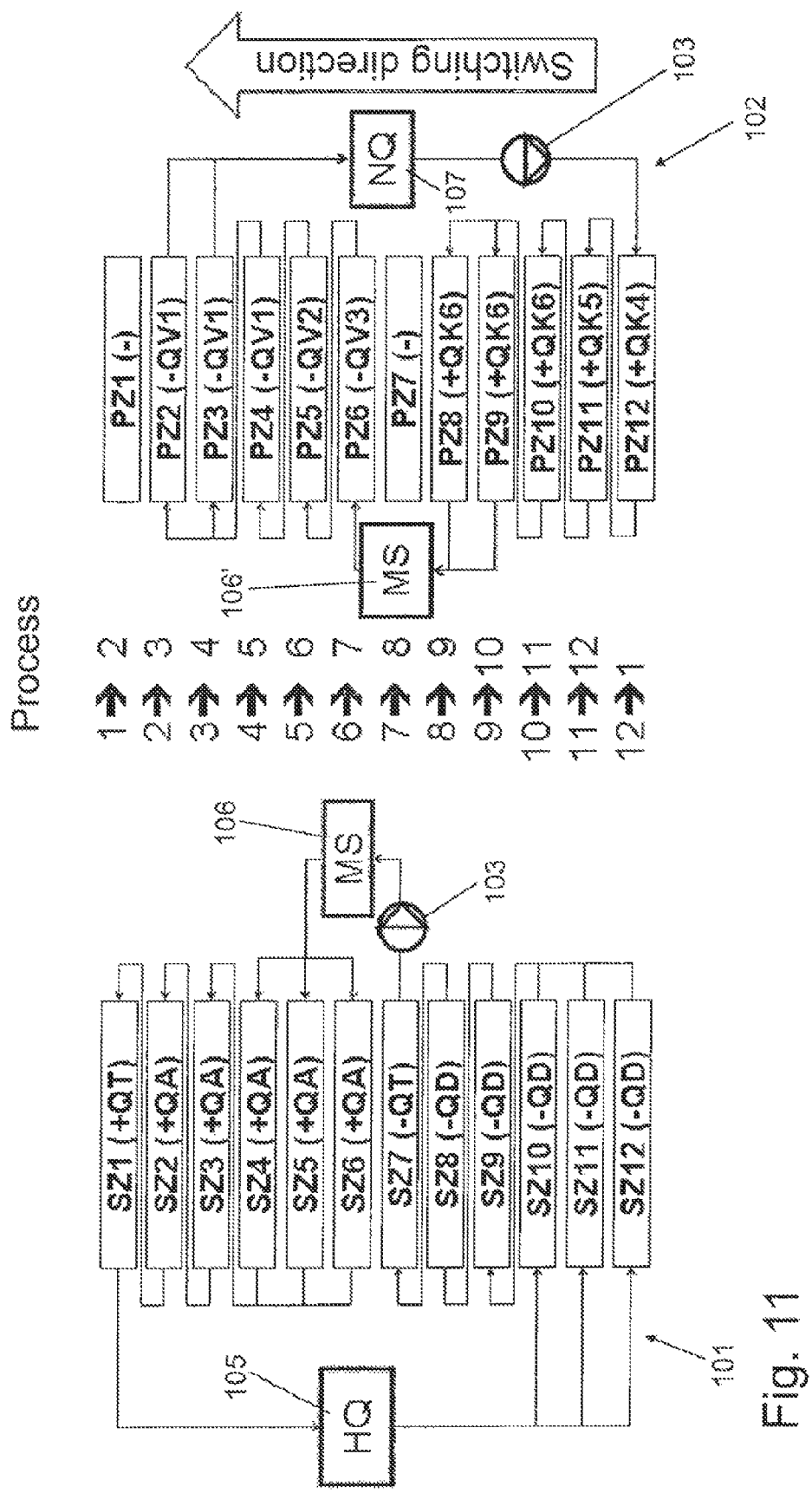
Figure 12:
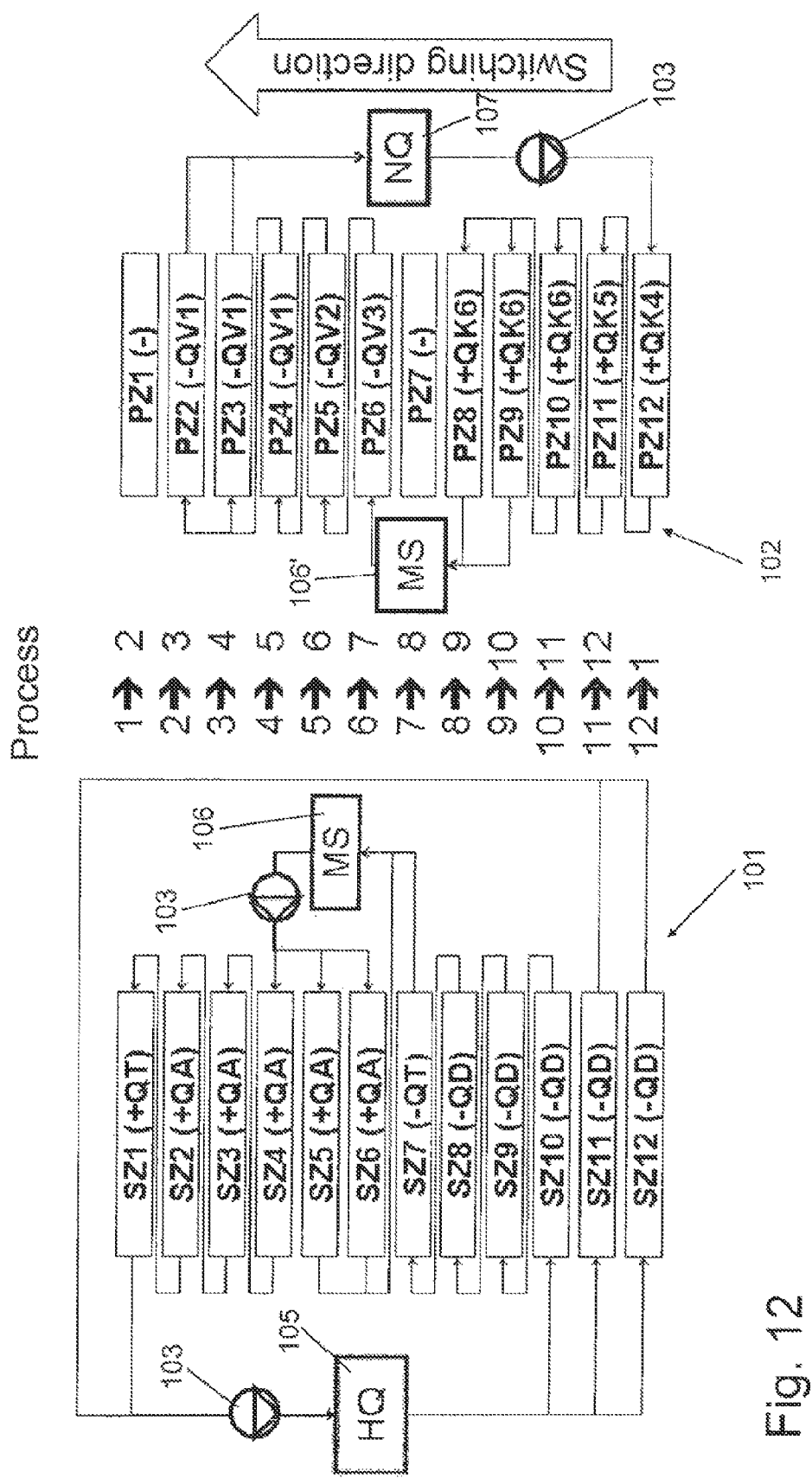
Figure 14:
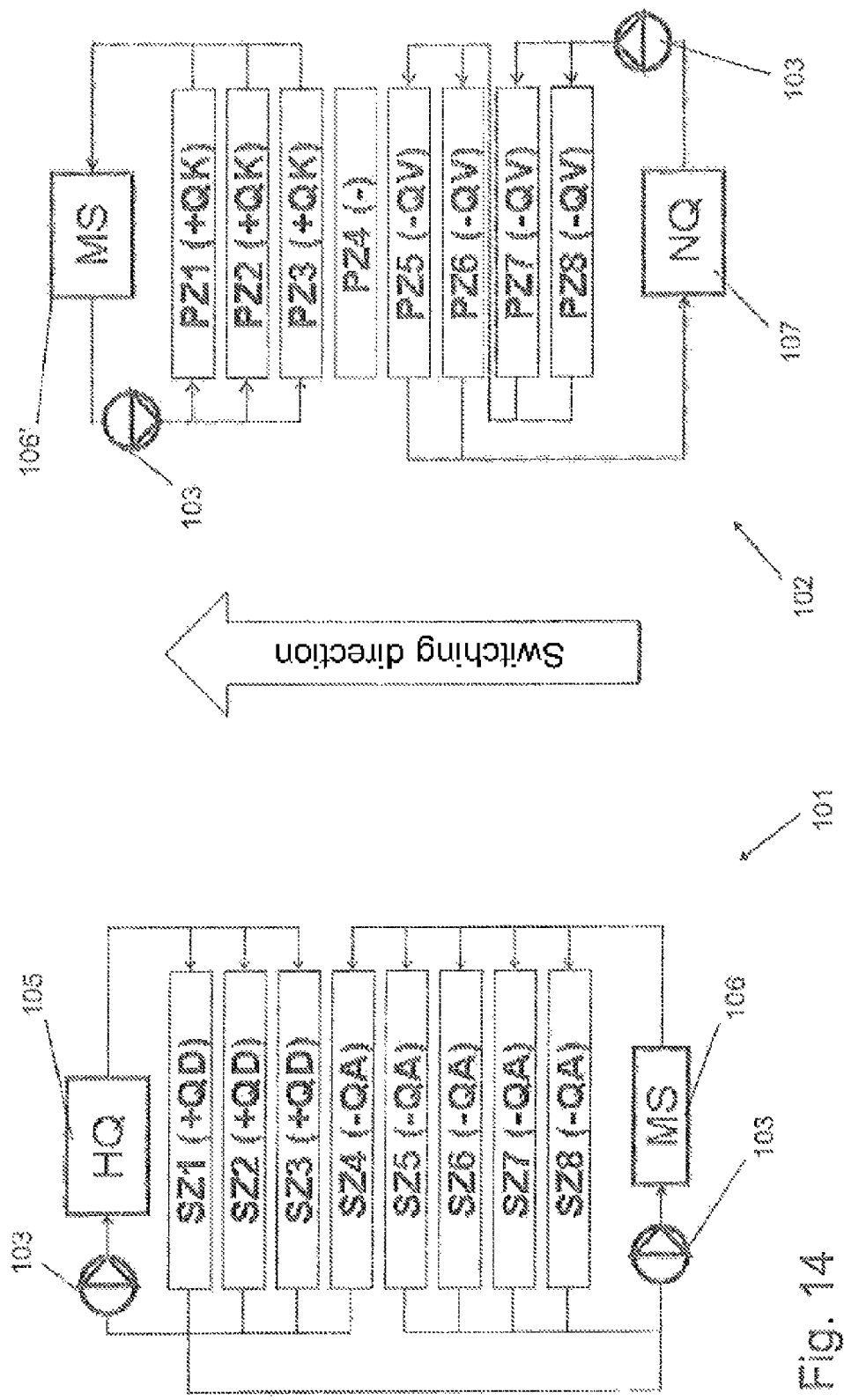
Figure 15:
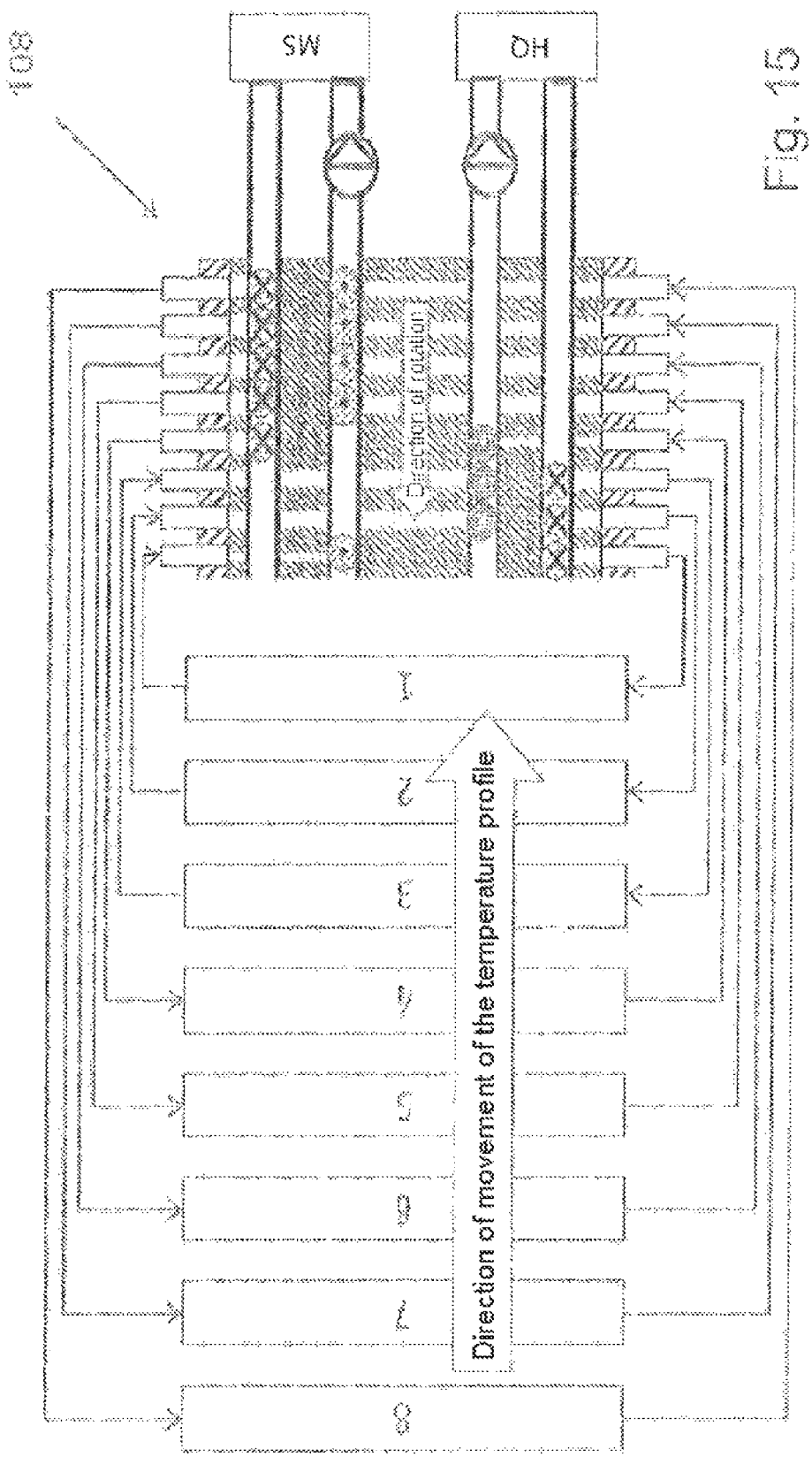
Figure 16:
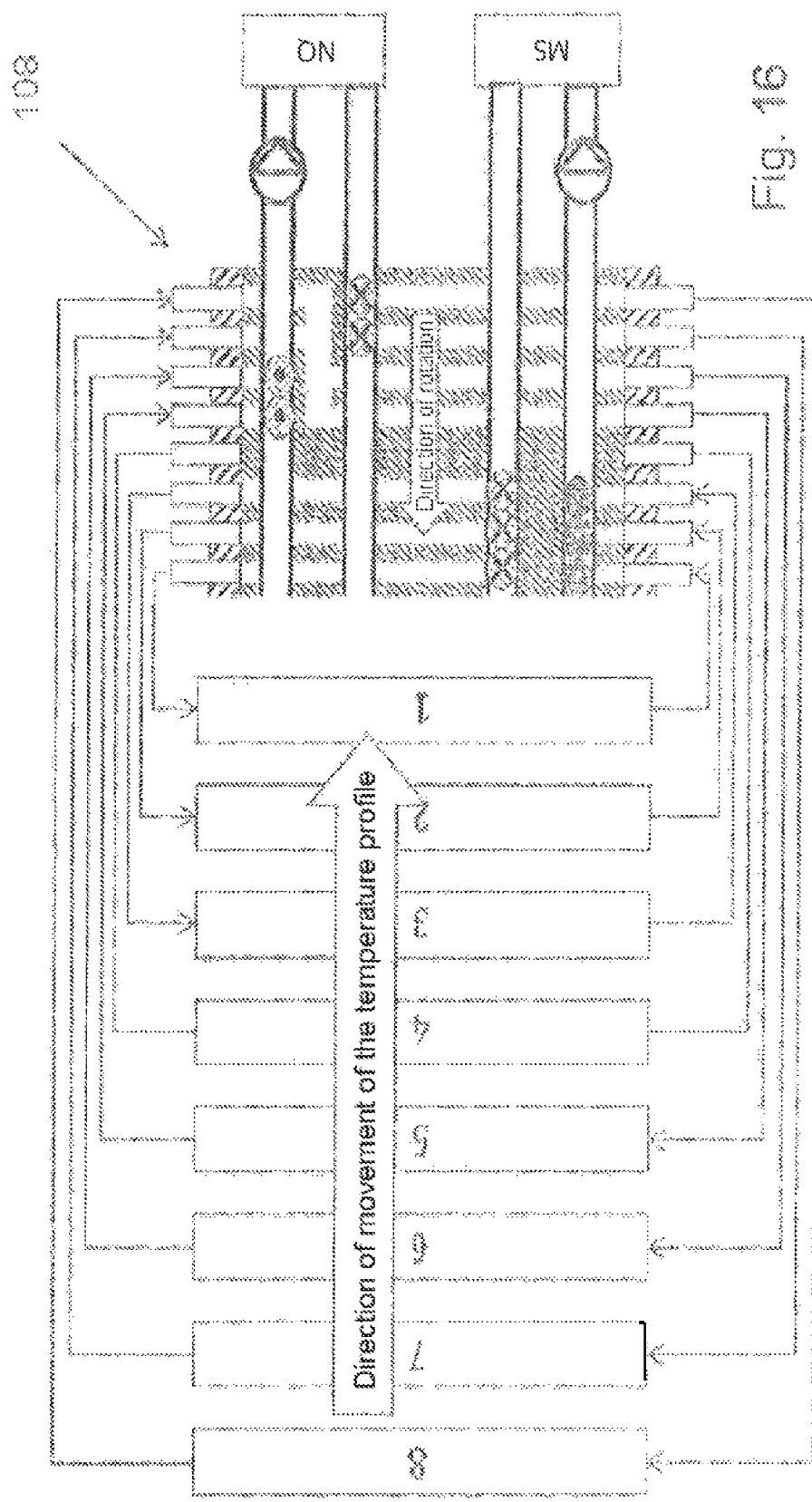
Figure 17:
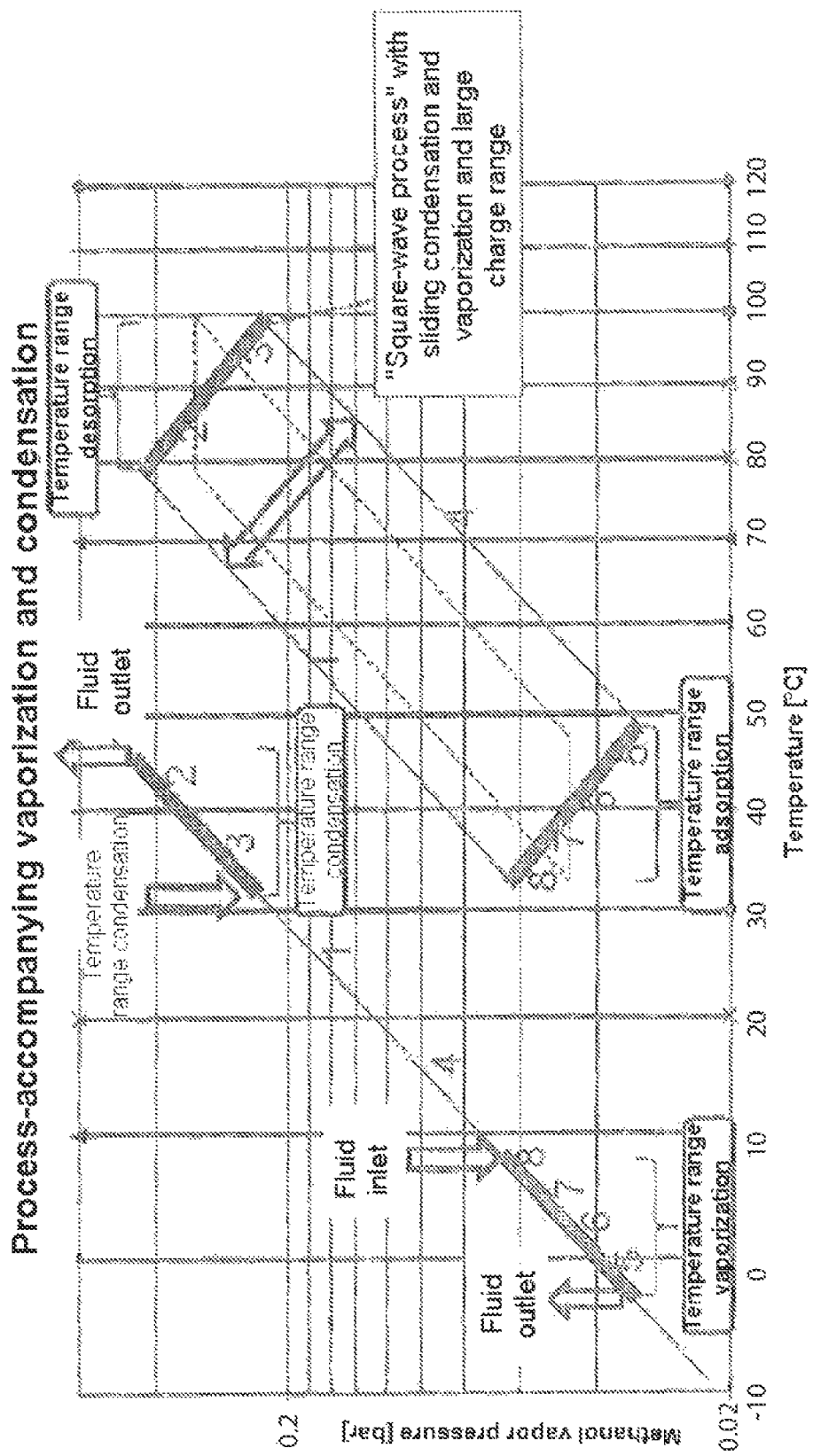

A number of exemplary embodiments of the invention are described below and explained in more detail with reference to the appended drawings, in which:

FIG. 1 shows a circuit arrangement of a first exemplary embodiment of a heat pump according to the invention, FIG. 2 shows a temperature/pressure diagram with cyclic processes of the sorption side and of the phase change side of the heat pump from FIG. 1, FIG. 3 shows a schematic expanded view of a rotation valve for controlling a sorption-side flow of fluid through the heat pump from FIG. 1, FIG. 4 shows a longitudinal section through a schematic illustration of the rotation valve from FIG. 3, FIG. 5 shows a cross section through the rotation valve from FIG. 4 along the line A-A, FIG. 6 shows a cross section through the rotation valve from FIG. 4 along the line B-B, FIG. 7 shows a schematic expanded view of a rotation valve for controlling a phase-change-side flow of fluid through the heat pump from FIG. 1, FIG. 8 shows a longitudinal section through a schematic illustration of the rotation valve from FIG. 7, FIG. 9 shows a circuit arrangement of a second exemplary embodiment of a heat pump according to the invention, FIG. 10 shows a temperature/pressure diagram with cyclic processes of the sorption side and of the phase change side of the heat pump from FIG. 9, FIG. 11 shows a circuit arrangement of a third exemplary embodiment of a heat pump according to the invention, FIG. 12 shows a circuit arrangement of a fourth exemplary embodiment of a heat pump according to the invention, FIG. 13 shows a circuit arrangement of a fifth exemplary embodiment of the invention, FIG. 14 shows a circuit arrangement of a sixth exemplary embodiment of the invention, FIG. 15 shows a schematic expanded view of a rotation valve for controlling a sorption-side flow of fluid through the heat pump from FIG. 14, FIG. 16 shows a schematic expanded view of a rotation valve for controlling a phase-change-side flow of fluid through the heat pump from FIG. 14, and FIG. 17 shows the idealized square-wave-form process control aimed at with the circuits from FIGS. 13 to 16, in the log p-1/T-diagram with an enlarged charge range.

The heat pump which is illustrated in a functionally schematic fashion in FIG. 1 comprises a plurality of hollow elements, in the present case 12, which are preferably each of identical design and arranged one next to the other. Precise embodiments of such hollow elements in terms of equipment are known and can be found, for example, in WO 2007/068481 A1. The hollow elements may be, for example, embodied as hermetically sealed longitudinal bodies, wherein an adsorbent, on the one hand, and a means for storing fluid, for example capillary structures, on the other hand, are provided in each of the end areas.

Each of the 12 hollow elements has in each case a sorption area (SZ1 to SZ12) which are illustrated in the left-hand half of FIG. 1. In the sorption area there is in each case a quantity of the absorbent such as, for example, activated carbon. In addition, each of the hollow elements has a phase change area (PZ1 to PZ12) in the form of capillary structures, illustrated in the right-hand half of FIG. 1.

Reference symbols with digits 1 to 12 contained in the drawings respectively relate to the numbering of the hollow elements and/or of their sorption areas and phase change areas according to the context.

In the hollow elements, in each case a defined quantity of a working medium, in the present case methanol, is enclosed, with the result that the working medium can change between the absorbent and the capillary structures depending on an applied temperature of the sorption area and/or phase change area.

Fluid circuits 101, 102 are respectively provided on the sorption side (on the left in FIG. 1) and on the phase change side (on the right in FIG. 1), by means of which fluid circuits 101, 102 a heat-transporting fluid can be made to flow through the individual sorption areas and phase change areas of the hollow elements. For this purpose, in each case one circulation pump 103 is provided per fluid circuit, as well as a valve arrangement (not illustrated in FIG. 1), by means of which the hollow elements are switched further cyclically with respect to their state in the fluid circuit.

In addition to the exchange of heat of the fluid with the sorption areas SZ1-SZ12, exchange also occurs with a heat source HQ (high temperature heat reservoir) on the sorption side via a heat exchanger 105 and with a heat source MS (medium temperature heat reservoir) via a heat exchanger 106 as a recooler.

In addition to the exchange of heat of the fluid with the phase change areas PZ1-PZ12, exchange also occurs with a heat source NQ (low temperature heat reservoir) on the phase change side via a heat exchanger 107 and with the heat source MS (medium temperature heat reservoir) via a heat exchanger 106'. Depending on the embodiment, in particular the medium temperature heat sources may be identical, for example in the form of the surrounding air. The respective heat exchangers 106, 106' may then be structurally integrated or else be provided as a single heat exchanger, for example with connection of the two fluid circuits 101, 102.

In one possible use of the heat pump for air-conditioning living accommodation, the heat exchanger 107 corresponds to a vaporizer which is designed to cool an air stream to the temperature level NQ, as low as possible below a dew point in order to simultaneously dehumidify the air. The heat reservoir MS can then correspond to the external air. The heat source HQ may be, for example, dissipated heat from a block heat and power plant or else heat from a solar module. Finally, the cooling of the air from the level MS to the level NQ ("temperature elevation" MS-NQ) is then driven by a heat flow from the level HQ to the level MS ("temperature shift" HQ-MS).

The cyclic process in FIG. 2 which is illustrated in an isostere diagram is decomposed here into 12 substeps, which are each run through in a chronologically offset fashion in succession by each hollow element. Since the number of partial processes corresponds to the number of hollow elements, for each partial process there is just one hollow element which runs through said partial process. For reasons of simplicity, the consideration time is selected such that the hollow element number corresponds to the partial process number. After a defined time interval, each hollow element is switched further by one process step and so on until the entire cycle is repeated after 12 steps.

From FIG. 1 it is apparent that the heat exchange medium flows through the hollow elements partially in parallel on the sorption side and partially serially in the direction of the decreasing hollow element numbers. As a result, in the process steps with a change in adsorber temperature a type of counter flow circuit of the hollow elements (decreasing hollow element numbers) is produced with respect to the switching further of the hollow elements (increasing hollow element numbers). In contrast, there is a parallel flow through the hollow elements with the same sorption temperature.

Toward the right-side of FIG. 1 there are also areas on the phase change side (vaporization/condensation zones) with a parallel flow and a serial flow through the hollow elements as well as two hollow elements (Nos 1 and 7) through which is there is no flow.

As a result, in terms of circuitry there are 4 areas in the fluid circuit 101 of the sorption zones (on the left in FIG. 1) and the phase change zones (on the right in FIG. 1) whose function will be described with respect to FIG. 2, firstly in a general way and then in detail:

the process steps from state 1 to state 5 in FIG. 2 comprise extraction of heat when the temperature is decreasing (1⇒ 2: isosteric cooling and 2⇒ 5 isobaric adsorption). This is followed by an isothermic heat extraction phase in the case of increasing pressure up to the point 7 (isothermic adsorption). The process steps from the state point 7 to 11 characterize feeding in of heat when the temperature increases (7⇒ 8: isosteric heating and 8⇒ 11: isobaric desorption). This is followed by an isothermic heat input phase in the case of decreasing pressure until the state 1 is reached again (isothermic desorption).

The additional information placed between parentheses in FIG. 1 for denoting the hollow element areas have the following meaning:

+Q: heat input, −Q: heat output, A: adsorption, D: desorption, T: temperature change; V: vaporization, K: condensation, (−): adiabatic phase.

In the text which follows, the individual 12 subprocess steps along the flow path of the sorption side and the processes occurring in parallel on the phase change side will be described in detail starting with the state point 1:

1. This state is characterized by a completely desorbed and still hot sorption area (SZ1) which is subsequently cooled with constant loading (isosteric). In this context, according to FIG. 1 the heat exchange medium which is already heated up and which comes from the sorption area (SZ2) arranged upstream is heated up further once more before it is then fed to the high temperature heat source (HQ) for further heating. The phase change zone (P21), in pressure equilibrium, of the hollow element does not have a heat exchange medium applied to it, as a result of which it can cool adiabatically from the state V3 to the state V1 (see FIG. 2) without appreciable evaporation of working medium.

2. When the process vertex point 2 is reached, the refrigerant fluid coming from the low temperature heat source NQ flows through the phase change zone, wherein the working medium is vaporized to a low vaporization pressure level (V1). At the same time, a somewhat recooler working medium flows through the pre-cooled sorption area and as a result is cooled further to the state 3 while absorbing vaporized working medium. The adsorption heat which occurs at a still relatively high temperature level is fed to the heat exchange medium which is already heated up to a relatively large extent.

3. This adsorption process is firstly continued with an incremental relatively low heat exchanger medium temperature to the state point 4, 4. and in the hollow element through which there was previously a flow said adsorption process is finally continued to the state point 5 at a constantly low temperature.

5. Starting from the state point 5, the fluid which has been largely recooled to the ambient temperature (MS) is made to flow directly through the hollow element on the sorption side corresponding to FIG. 1. By causing a somewhat warmer heat exchange medium from a separate intermediate circuit ZK to flow through the phase change area, the vaporization pressure is raised to the level V2. The associated increase in pressure at the sorption area causes the latter to be able to absorb further working medium up to the state point 6 without a rise in temperature.

6. The fluid coming from the rerecooler 106 (medium temperature heat source MS) is also applied to the heat element assigned to this partial process in a parallel connection with the hollow element from process step 5 at the lowest possible temperature. Since a still hotter fluid is applied to the phase change area, as a result of which the vapourization process is essentially at the pressure level V3, the sorption area can also absorb further working medium without a decrease in temperature. The increased fluid temperature of the intermediate circuit ZK of the phase change side has been reached by absorbing condensation heat from the process step 11 which will be described later. As a result of the increased adsorption pressure, the adsorption area can absorb further working medium at a virtually constant temperature.

7. At the state point 7, the maximum charge of the adsorption area is reached and a heat input phase into the adsorption area starts. Since the adsorption area is virtually still at the ambient temperature, still only moderately warm fluid is sufficient for heating, said fluid outputting its residual heat to the adsorption area, as a result of which the temperature thereof approaches the ambient temperature more closely before it is fed to the rerecooler 106 (MS) for cooling to the ambient temperature. Since the associated phase change area PZ7 is kept adiabatic by the lack of flow, the working medium pressure increases in a virtually isosteric fashion to state point 8.

8. At this pressure level, further heat is input at the higher temperature level, as a result of which working medium is now desorbed and condensed at a correspondingly high condensation temperature (K6). As is shown by the diagram in FIG. 2, said temperature is approximately at the level of the two adsorption final temperatures, as a result of which a common rerecooler 106, 106' can be used to output the adsorption heat levels and the condensation heat. As a result of the limited fluid temperature, this process ends at the state point 9.

9. In the following process step, the hollow element is desorbed with a somewhat higher fluid temperature to the state point 10, wherein the phase change area is cooled at the same temperature level K6 in a parallel circuit with a fluid which is also recooled to the ambient temperature level (MS).

10. This process is continued up to the state point 11 with a still higher desorption temperature, wherein further condensation heat is output to the recooled fluid at the level K6.

11. In the following process step, the adsorption area is further desorbed directly with the heat source temperature HQ, while the condensation temperature level of the phase change area is decreased to the level K5. According to FIG. 1, this temperature is made available by a pre-cooled heat exchange medium of the separate intermediate circuit ZK. In this context, essentially isothermic desorption of the adsorption area takes place at process point 12.

12. This process is continued in the next process step by further lowering the condensation pressure level and temperature level with the same maximum fluid temperature for the desorption. This is achieved in that the heat exchange medium, precooled from process step 5, of the preferably separate intermediate circuit ZK is applied directly to the phase change area. This partial process step ends when the start state 1 is reached.

In the example of a heat pump explained above, a number of hollow elements are therefore respectively arranged parallel to one another both on the sorption side and on the phase change side and there is a flow through a number of hollow elements serially and in succession. In particular, these are the following groups:

sorption side parallel: SZ5 with SZ6, SZ11 with SZ12,
sorption side serial: SZ10 to SZ7 and SZ4 to SZ1,
phase change side parallel: PZ2 to PZ4 and PZ8 to PZ10,
phase change side serial: PZ5 with PZ6 and PZ11 with PZ12.

In particular, in the present case those hollow element groups which are connected in parallel on the sorption side are respectively connected serially on the phase change side.

FIG. 3 to FIG. 6 show different illustrations of a preferred structural implementation of a valve arrangement for controlling the fluid circuit 101 of the sorption side in FIG. 1. The valve arrangement can be rotated here as a single rotation valve 108 with a cylindrical casing 109 and a rotation body 110 which is arranged therein and which can be rotated about a shaft 110a in the fixed casing 109.

The illustration in FIG. 3 is a schematic expansion of the rotation body 110, which makes the function particularly clear. The rotation body 110 has a total of four rotating annular spaces 111 which are sealed with respect to the casing 109 by means of sliding seals 112. External radial openings 113 connect the annular spaces 111 to the respective heat exchangers 105, 106 toward the outside, with the result that any inflow and outflow of a heat exchanger 105, 106 is connected to precisely one of the four annular spaces 111.

The rotation body 110 also has axial through-ducts 114 which run completely through it. In this context, some of the through-ducts can be combined (or branched) to form a single duct, for example at the junction of the hollow elements 11 and 12 with the hollow element 10 (cf. FIG. 1).

The rotation body also has axial blind ducts 116 which open into one of the annular spaces 111 via internal radial openings 115. In the expanded view in FIG. 3, these junctions are illustrated as a plan view of arrow tips and arrow shafts. This produces the connections between one or more of the hollow elements and one or the heat exchangers 105, 106.

The cyclically changing connection is implemented by incremental further rotation of the rotation body 110, as a result of which end-side openings 117 in the casing 109 alternately overlap with the axial mouths of the through-ducts 114 and blind ducts 116 in the rotation body. Suitable sealing means 121, for example ceramic sealing washers, may be provided in the region of the end-side overlap.

In a central area 118 of the rotation body it is possible to provide spring means (not illustrated) which press a first rotation body part 119 and a second rotation body part 120 away from one another and respectively against the axially end-side sealing rings 121. The connection of the through-ducts 114 in the central area 118 can occur for example via hose pieces. In one possible embodiment, the branches and junctions can be formed, for example, by means of the hose pieces.

The numbering of the end-side connections on the casing 109 corresponds to the connections to the sorption-side hollow elements or the switched state according to FIG. 1.

FIG. 7 and FIG. 8 show a rotation valve 108 as a valve arrangement of the phase change side. The design and function are largely analogous to the valve 108 of the sorption side. Owing to the different connection, the rotation valve 108 of the phase change side has a total of seven annular spaces 111, each with up to three inner radial openings 115 in the rotation body 110. A circulation pump 103 is connected to two of a total of six outer radial openings 113, in order to circulate the intermediate circuit ZK.

FIG. 9 shows a further exemplary embodiment of a heat pump according to the invention. In contrast to the first example, here in each case three hollow elements are connected in parallel with one another, specifically the groups SZ4 to SZ6 and SZ10 to SZ12 on the sorption side. As a result, a further increase in the ratio of the temperature elevation to the temperature shift can be achieved. In an analogous fashion, the same groups of hollow elements (PZ4 to PZ6 and PZ10 to PZ12) are connected serially in the intermediate circuit on the phase change side.

The further improvement in the temperature elevation which can be achieved by the example according to FIG. 9 is obtained by comparing the associated diagram according to FIG. 10 with the corresponding diagram for the first exemplary embodiment (FIG. 2).

Basically, according to the invention any desired apportionment of hollow elements which are connected in parallel and serially can be provided depending on the requirements, in order to influence the temperature elevation and temperature shift. In order to further optimize the temperature elevation, particularly advantageously at least one third of the total number of the hollow elements on the sorption side are connected in parallel. In the first exemplary embodiment, this is precisely the case with four hollow elements which are connected in parallel from a total of twelve hollow elements. In the second exemplary embodiment according to FIG. 9, precisely half the sorption-side hollow elements are connected in parallel.

In the two exemplary embodiments of the invention described above, in each case a total of three circulation pumps are provided on the phase change side, with the result that both groups of hollow elements which are connected in parallel and the intermediate circuit can be set separately from one another with respect to the fluid mass flows. As a result, particularly precise adjustment of the heat pump can be carried out in order to optimize its efficiency.

In contrast, there is only a single circulation pump 103 on the sorption side, wherein the fluid mass flow is apportioned or summed in accordance with the branches present in the lines or valve arrangements. This is a cost-effective solution which provides little adjustability with respect to the optimum respective mass flows.

FIG. 11 shows a third exemplary embodiment which corresponds in its sorption-side connection to the second example according to FIG. 9. However, on the phase change side there is no intermediate circuit anymore but rather all the hollow elements are connected into a fluid circuit which is driven with just one circulation pump 103. Furthermore, here both groups of hollow elements which are connected in parallel and groups of hollow elements which are connected serially are present in a way analogous to the example according to FIG. 9. The example according to FIG. 11 is particularly cost-effective owing to the small number of circulation pumps 103. Said example can be used advantageously in particular when the hollow elements are each constructed from a plurality of submodules and/or high temperature spreads are permissible or desired at the external heat exchangers. This is particularly advantageous when using external heat exchangers in a cross/counterflow connection, preferably for air as a heat source and/or heat sink.

FIG. 12 shows a further exemplary embodiment in which a connection with just one circulation pump 103 has been selected on the phase change side as in the example according to FIG. 11. In contrast, on the sorption side a combination of two partial circuits which communicate with one another and which are circulated by means of precisely two circulation pumps are selected. The fluid mass flow coming from one of the heat exchangers 105, 106 is also respectively divided among three hollow elements here but the return lines of two of these modules are fed directly again to the heat exchanger as a connected partial circuit. The fluid mass flow which is one of these three parallel hollow elements is fed to the following serially connected hollow elements. By controlling the two pumps and/or flow limiters (not illustrated) it is therefore possible to adjust to a wide degree groups of hollow elements which are connected serially and groups of hollow elements which are connected in parallel, wherein it is nevertheless possible to dispense with a third circulation pump.

The example according to FIG. 12 corresponds to the invention at least within the scope of claims 1 and 15.

Of course, the features of the respective exemplary embodiments can be appropriately combined with one another depending on the requirements. This applies in particular to the proposed connections with one, two or three circulation pumps which can be used both on the sorption side and on the phase change side depending on the requirements.

It is therefore possible, for example, for a circuit with three separate partial circuits or three circulation pumps as on the phase change side in the example according to FIG. 1 also to be used on the sorption side. In this case, all the hollow elements which are connected in parallel and are coupled directly to the heat source 105 (HQ) and the heat sink 106 (MS) would be fed back directly to these external heat exchangers. The intermediate circuit performs here the recovery of the sensitive heat levels at the temperature change from the desorption temperature to the adsorption temperature and back with a further pump.

In all the circuit variants described above, the connection profile and temperature profile were shifted in the direction of decreasing numbering of the modules by incrementally rotating the rotation valves 108. Basically, it is necessary to ensure correctly phased further connection of the two valves 108 in the same direction. However, it may also prove advantageous to allow the switching times for controlling the fluid of the sorption areas and of the phase change areas to be offset chronologically with respect to one another in order to allow for the different kinetics and time delays of the kinetic processors occurring in the modules.

Characteristic of all the circuits is, on the one hand, the combination of parallel circuits and serial circuits of hollow elements for the sorption areas and, if appropriate, the phase change areas. On the other hand, the essentially complementary connection of the sorption areas and of the phase change areas of all hollow elements is characteristic in the sense that groups of hollow elements which are connected in parallel on the sorption side are essentially connected serially on the phase change side, and vice versa.

In each case, that hollow element (PZ1, PZ7) at which the process changes from the vaporization process to the condensation process and vice versa preferably, but not necessarily, does not have a flow through it on the phase change side, wherein on the sorption side a virtually isosteric pressure and temperature change takes place. By apportioning the modules into complementary groups which are connected in parallel and serially, the ratio of the temperature elevation to the temperature shift (MS-NQ)/(HQ-MS) can be varied without reducing the charge range of the adsorbent and can be adapted in an optimum way to the desired relative temperatures of the available heat sources (HQ, NQ) and heat sink (MS).

FIG. 13 shows a circuit or arrangement of hollow elements which corresponds, in particular, to the invention within the scope of claim 15. In this context, a total number of 8 hollow elements with sorption areas (SZ1 to SZ8) and phase change areas (PZ1 to PZ8) are present. The schematic illustration and designation are analogous to those in the preceding exemplary embodiments.

In this embodiment, in accordance with the left-hand illustration, all the sorption-side hollow elements are assigned to two groups of elements through which there is a parallel flow, which elements form two completely separate circuits together with a respective circulation pump 103 and a heat exchanger HQ, MS. The upper circuit is connected here to a high temperature heat source HQ, and the lower circuit is connected to a medium temperature heat sink MS.

The group of elements through which there is a parallel flow from the medium temperature circuit is particularly advantageously larger than the group of elements through which there is a flow from the high temperature circuit. In the present case, the ratio of the numbers is 3:5. This takes into account the generally larger kinetics of the desorption process compared to the adsorption process.

The corresponding phase change zones of the hollow elements (right-hand illustration in FIG. 13) particularly likewise each have a parallel flow at least on a group basis. In the exemplary embodiment according to FIG. 13, the first group PZ1-PZ3 with a medium temperature heat sink (MS) and a circulation pump forms again a separate circuit. The second group of hollow elements PZ4-PZ8 is divided into two subgroups through which there is a parallel flow but which are connected serially in this exemplary embodiment and form a separate circuit with the low temperature heat source NQ and a second circulation pump 103 of the phase change zone.

In this case, the connection logic, defined by means of a valve arrangement, of the fluid connections is moved incrementally upward in defined time steps with respect to the illustration, with the result that each module is cyclically assigned to the differently temperature-controlled circuits. The switching times at which the valves are switched further by one position are advantageously chronologically offset in such a way that the switching times of the valve arrangement for the phase change zones occurs later by a defined time interval to the switching time of the valve arrangement of the sorption zones. As a result, the thermal inertia when the new physical states in the hollow elements are set is taken into account.

The example according to FIG. 13 corresponds, in particular, to the invention within the scope of claim 15.

FIG. 14 shows a further embodiment similar to FIG. 13 in which the two sorption-side fluid circuits are not completely separated in order to implement a heat recovery means. Instead, the return lines of the two hollow elements SZ1 and SZ4 are assigned to the respectively complementary circuit. This involves those hollow elements which still have a high thermal capacity after the valve switching operation.

It is proposed here that the volume flows of the hollow elements through which there is a parallel flow, in particular the volume flows of the respective junction elements (that is to say the hollow elements SZ1 and SZ4 in the illustrated switched state) are distributed by means of cross-sectional adaptations and/or restrictor elements which are provided in a defined fashion in the valve arrangement, such that the temperature change in the junction hollow elements just occurs completely within the defined time step interval of the valve arrangement. In this way, the temperature ramp of the temperature profile which is formed in the respective hollow elements is just pushed through completely within this time step range, as a result of which the recovered heat reaches a maximum. In the illustration of a valve arrangement according to FIG. 15, such measures are illustrated schematically by different widths of the passages in the valves. For example, the passages following the outlets of the hollow elements denoted by "1" and by "4" (corresponding to SZ1 and SZ4 in the illustration according to FIG. 14) have a particularly small cross section in the valve.

Since the hollow element SZ1 is therefore connected in each case serially to the hollow elements SZ6, SZ7 and SZ8 which are connected in parallel and in addition the hollow element SZ4 is connected in each case serially to the hollow elements SZ2, SZ3 and SZ4 which are connected in parallel, the example according to FIG. 14 corresponds to the invention at least within the scope of claims 1 and 15.

In the exemplary embodiment according to FIG. 14, on the phase change side there is no flow through the phase change zone (see right-hand side of the illustration) of the hollow element PZ4, with the result that after the switching over of the corresponding sorption zone the hollow element firstly carries out an adiabatic process change on the phase change side. Additionally or alternatively, the switching times of the valve for the phase change zone can occur with a delay in relation to the switching times of the valve arrangement for the sorption zones.

With the exemplary circuit variants which combine parallel and serial types of flow through the hollow elements with one another, it is possible, given suitable adjustment of the fluid mass flows, to ensure that a virtually square-wave-form process profile is passed through in accordance with the diagram according to FIG. 17.

The abovementioned circuit variants, in particular according to FIG. 13 and FIG. 14, also have the advantage that given the temperature elevation and temperature shift which are predefined by the temperature levels of the heat reservoirs, the charge range can be made significantly larger, as is indicated by the double arrow. Conversely, this means, of course, that by using a comparable charge range it is possible to implement a better ratio of the temperature elevation and temperature shift.

The numbers on the square-wave process symbolize the average states which the module numbers from FIG. 14 pass through.

The sliding temperature elevations, in particular of the condensation circuit and of the vaporizer circuit, can additionally be used to operate the assigned fluid circuits with a relatively large inlet/outlet spread and comparatively low mass flows in order to keep the pump and blower power levels low.

The invention claimed is:

1. An heat pump comprising:
a plurality of hollow elements,
wherein each hollow element encloses a phase change area comprising a capillary structure and an adsorber area comprising an adsorbent,
wherein the adsorber area and the phase change area further enclose a working medium that is displaceable between the adsorbent area and the phase change area, wherein the working medium enclosed in the phase change area and the adsorber area is fluidically divided from remaining portions of the plurality of hollow elements,
wherein a heat-transporting fluid flows through the remaining portions of the plurality of hollow elements in a first circuit and a second circuit,
wherein in the first circuit the heat-transporting fluid passes through a first flow channel permeating each hollow element of the plurality of hollow elements which are brought into thermal contact with the adsorber areas,
wherein in the second circuit the heat-transporting fluid passes through a second flow channel permeating each hollow element of the plurality of hollow elements which are brought into thermal contact with the phase change areas,
wherein the heat-transporting fluid of the first circuit and the second circuit flows through the plurality of hollow elements in a fluid circuit which is varied by a valve arrangement,
wherein the flow of the heat-transporting fluid through the plurality of hollow elements changes cyclically,
wherein each position of the valve arrangement, heat-transporting fluid flows in parallel through at least two of the hollow elements of the plurality of hollow elements in each of the first circuit and the second circuit,
wherein the flow passes serially in succession through at least two of the hollow elements of the plurality of hollow elements in each of the first circuit and the second circuit,
wherein a number of hollow elements through which there is a parallel flow corresponds at least approximately to a quarter of the number of hollow elements of the plurality of hollow elements through which there is a serial flow in each of the first circuit and the second circuit.

2. The heat pump as claimed in claim 1, wherein in each position of the valve arrangement the parallel flow in each case is in at least two groups of the plurality of hollow elements, wherein at least one of the groups is arranged directly upstream or downstream of a heat exchanger.

3. The heat pump as claimed in claim 1, wherein a further heat-transporting fluid flows through the plurality of hollow elements in a fluid circuit which is varied by a further valve arrangement, wherein the hollow elements are brought into thermal contact with the further heat-transporting fluid in the phase change area, wherein the flow of the further heat-transporting fluid through the plurality of hollow elements changes cyclically.

4. The heat pump as claimed in claim 3, wherein in at least one position of the further valve arrangement, the further heat-transporting fluid flows in parallel through at least two of the plurality of hollow elements in the phase change area, wherein the flow passes through at least two of the plurality of hollow elements serially in succession.

5. The heat pump as claimed in claim 4, wherein in each position of the further valve arrangement, the further heat-transporting fluid flows in each case in parallel through at least two groups of the plurality of hollow elements in the phase change area, wherein a heat exchanger is arranged directly upstream or downstream of at least one of the groups.

6. The heat pump as claimed in claim 1, wherein in a given position of the valve arrangement, a subset of the plurality of hollow elements is connected to form a partial circuit, wherein the heat-transporting fluid is circulated through the partial circuit by a circulation pump.

7. The heat pump as claimed in claim 6, wherein a total of three partial circuits are provided, wherein the partial circuits are separated and are each circulated by one of three circulation pumps.

8. The heat pump as claimed in claim 6, wherein a total of two circulation pumps are provided, wherein a first partial circuit is circulated by a first circulation pump, and a second partial circuit communicates with the first partial circuit and is circulated by a second circulation pump.

9. The heat pump as claimed in claim 1, wherein in each case the heat-transporting fluid does not flow through at least one of the hollow elements phase change area.

10. The heat pump as claimed in claim 9, wherein the hollow element which there is not a flow through the phase change area is arranged in each case between a group of hollow elements of the plurality of hollow elements which absorb heat in the phase change area and a group of hollow elements of the plurality of hollow elements which output heat in the phase change area.

11. The heat pump as claimed in claim 1, wherein the valve arrangement comprises at least one-rotation valve with a cylindrical casing and a valve body which is arranged rotatably therein.

12. The heat pump as claimed in claim 11, wherein the rotation valve comprises end-side feed lines and discharge lines for connecting to the individual hollow elements of the plurality of hollow elements.

13. The heat pump as claimed in claim 11, wherein the valve body forms at least one annular space, wherein at least two axial ducts open into the annular space, wherein the at least two axial ducts are each connected to the plurality of hollow elements which are connected in parallel, and wherein at least one radial opening of the annular space is provided, wherein the opening is connected to the at least two axial ducts via the annular space.

14. An adsorption principle heat pump comprising:
a plurality of hollow elements
wherein each hollow element comprises a phase change area comprising a capillary structure and an adsorber area comprising an adsorbent,
wherein the adsorber area and the phase change area further enclose a working medium that is displaceable between the adsorbent area and the phase change area, wherein the working medium enclosed in the phase change area and the adsorber area is fluidically divided from remaining portions of the plurality of hollow elements,
wherein a heat-transporting fluid flows through the plurality of hollow elements in a first circuit and a second circuit,
wherein in the first circuit the heat-transporting fluid passes through a first flow channel permeating each hollow element of the plurality of hollow elements which are brought into thermal contact with the adsorber areas,
wherein in the second circuit the heat-transporting fluid passes through a second flow channel permeating each hollow element of the plurality of hollow elements which are brought into thermal contact with the phase change areas
wherein the heat-transporting fluid of the first circuit and the second circuit flows through the plurality of hollow elements in a fluid circuit which is varied by a valve arrangement,
wherein the flow of the heat-transporting fluid through the plurality of hollow elements changes cyclically,
wherein in each position of the valve arrangement, at least a first subset of the hollow elements is arranged downstream of a first circulation pump of the first circuit and a second subset of the hollow elements is arranged downstream of a second circulation pump of the second circuit.

15. The heat pump as claimed in claim 14, wherein the at least one of the first and second subsets of the plurality of hollow elements comprises at least two hollow elements of the plurality of hollow elements which are arranged parallel to one another downstream of the respective circulation pump.

16. The heat pump as claimed in claim 14, wherein in each position of the valve arrangement the first and second subsets of plurality of hollow elements belong to two separate partial circuits of the heat-transporting fluid.

17. The heat pump as claimed in claim 14, wherein the first subset of the plurality of the hollow elements belongs to a first partial circuit of the heat-transporting fluid, and the second subset of the plurality of the hollow elements belongs to a second partial circuit of the heat-transporting fluid, wherein the first and second partial circuits are connected to one another via at least one hollow element.

18. The heat pump as claimed in claim 14, wherein the valve arrangement contains cross-sectional adaptations and/or restrictor elements, wherein cross-sectional adaptations and/or restrictor elements cause recovered heat to be maximized.

19. The heat pump as claimed in claim 14, wherein in at least one position of the valve arrangement, the heat-transporting fluid flows in parallel through at least two of the plurality of hollow elements, wherein the flow passes serially in succession through at least two of the plurality of hollow elements.

* * * * *